US012677990B2

(12) United States Patent
Ritter et al.

(10) Patent No.: US 12,677,990 B2
(45) Date of Patent: Jul. 14, 2026

(54) AGRICULTURAL VEHICLES FOR COLLECTING GRAIN OR OTHER AGRICULTURAL MATERIAL

(71) Applicant: DEERE & COMPANY, Moline, IL (US)

(72) Inventors: Aaron S. Ritter, Milan, IL (US); Snehalrao Jadhav, Satara (IN)

(73) Assignee: DEERE & COMPANY, Moline, IL (US)

( * ) Notice: Subject to any disclaimer, the term of this patent is extended or adjusted under 35 U.S.C. 154(b) by 868 days.

(21) Appl. No.: 17/815,773

(22) Filed: Jul. 28, 2022

(65) Prior Publication Data

US 2023/0039607 A1 Feb. 9, 2023

Related U.S. Application Data

(60) Provisional application No. 63/228,843, filed on Aug. 3, 2021.

(51) Int. Cl.
*A01D 90/02* (2006.01)
*A47J 37/07* (2006.01)

(52) U.S. Cl.
CPC .......... *A47J 37/0763* (2013.01); *A01D 90/02* (2013.01); *A47J 37/0704* (2013.01)

(58) Field of Classification Search
CPC ........... A01D 41/1208; A01D 41/1226; A01D 90/10; A01D 75/02; A01D 90/00; A01D 90/02; B60P 1/00; B60P 1/435; B62D 33/03; B62D 63/06; B62D 63/08; B62D 33/027; B62D 33/0276; A01F 12/60
See application file for complete search history.

(56) References Cited

U.S. PATENT DOCUMENTS

| | | | | |
|---|---|---|---|---|
| 641,102 A | * | 1/1900 | Halloran | ................ A01D 90/00 296/6 |
| 1,319,729 A | * | 10/1919 | Sowers | .................. A01D 90/00 296/6 |
| 1,517,245 A | * | 12/1924 | Martin | ..................... B61D 7/08 105/308.2 |
| 3,224,496 A | | 12/1965 | Bruning | |
| 3,572,812 A | * | 3/1971 | Norcia | ............... B62D 33/0276 296/26.05 |

(Continued)

FOREIGN PATENT DOCUMENTS

| | | |
|---|---|---|
| DE | 824136 C | 12/1951 |
| DE | 202013007557 U1 | 10/2013 |

(Continued)

OTHER PUBLICATIONS

Extended European Search Report and Written Opinion issued in European Patent Application No. 23183880.6, dated Jan. 17, 2024, in 08 pages.

(Continued)

*Primary Examiner* — Joseph M Rocca

(57) ABSTRACT

Example grain carts have movable doors to provide access to an interior cavity. Grain carts may have more than one door, and the one or more doors are movable between an open position to expose one or more openings and a closed position to conceal one or more openings formed in one or more sides of a bin of the grain cart.

12 Claims, 20 Drawing Sheets

(56)                References Cited

U.S. PATENT DOCUMENTS

| | | | | |
|---|---|---|---|---|
| 3,840,134 A * | 10/1974 | Luscombe | ............. | B30B 9/3082 |
| | | | | 414/501 |
| 3,997,089 A * | 12/1976 | Clarke | ..................... | B61D 7/22 |
| | | | | 105/283 |
| 4,466,549 A | 8/1984 | Hanaway | | |
| 5,332,021 A * | 7/1994 | Todd | ......................... | A47K 3/38 |
| | | | | 160/192 |
| 6,948,766 B1 * | 9/2005 | Capote | ................... | B60J 11/025 |
| | | | | 296/99.1 |
| 7,189,042 B1 * | 3/2007 | Schmit | ................. | B60P 7/0823 |
| | | | | 410/97 |
| 7,585,214 B1 | 9/2009 | Johnson et al. | | |
| 8,113,565 B2 | 2/2012 | Zeuner et al. | | |
| 8,606,454 B2 | 12/2013 | Wang et al. | | |
| 8,944,898 B2 * | 2/2015 | Barnes | ............... | A01D 41/1226 |
| | | | | 460/119 |
| 9,462,748 B2 | 10/2016 | Dollinger et al. | | |
| 9,826,681 B2 * | 11/2017 | Claes | ................. | A01D 41/1226 |
| 9,829,364 B2 | 11/2017 | Wilson et al. | | |
| 9,937,962 B1 * | 4/2018 | Tyler | ................... | B62D 27/065 |
| 9,955,630 B2 * | 5/2018 | Steen | ................. | A01D 41/1226 |
| 10,019,790 B2 | 7/2018 | Bonefas et al. | | |
| 10,046,628 B1 * | 8/2018 | Fulton | ...................... | B60P 3/42 |
| 10,166,906 B1 * | 1/2019 | Lau | ............................ | B60J 5/08 |
| 10,494,037 B2 * | 12/2019 | Williams | ................. | B60P 7/08 |
| 10,851,572 B1 * | 12/2020 | Flynn | ................... | E06B 3/4636 |
| 11,628,760 B2 * | 4/2023 | Fatla | ...................... | B60P 1/435 |
| | | | | 410/37 |
| 2006/0124796 A1 * | 6/2006 | Morgan | ................. | G09F 17/00 |
| | | | | 242/390.8 |
| 2014/0311113 A1 | 10/2014 | Bonefas | | |
| 2016/0280123 A1 * | 9/2016 | Rohr | ...................... | B60J 7/067 |
| 2016/0332678 A1 * | 11/2016 | Leonardson | ....... | B62D 33/0276 |
| 2022/0396317 A1 * | 12/2022 | Savoie | ................ | B62D 33/027 |

FOREIGN PATENT DOCUMENTS

| | | |
|---|---|---|
| DE | 102016117133 A1 | 3/2018 |
| GB | 2475483 A1 | 5/2011 |

OTHER PUBLICATIONS

JLC/HFI "Can't Stay Here" 2013 Harvest Video, 3 pages, uploaded on Oct. 24, 2013. Retrieved from YouTube <URl: https://www.youtube.com/watch?v=WGRM1yahPVw&t=89s>.

* cited by examiner

AGRICULTURAL VEHICLES FOR COLLECTING GRAIN OR OTHER AGRICULTURAL MATERIAL

FIELD OF THE DISCLOSURE

The present disclosure relates to agricultural vehicles and, particularly, to vehicles used to collect grain during an agricultural harvesting operation.

BACKGROUND OF THE DISCLOSURE

During a harvesting operation, agricultural material, such as grain, present on a harvester is offloaded to another vehicle, such as grain cart. The agricultural material is offloaded from the harvester so that the harvester can continue harvesting. Offloading of the grain from the harvester to a grain cart can occur as the harvester is traveling and continuing to harvester the agricultural material.

SUMMARY OF THE DISCLOSURE

A first aspect of the present disclosure is directed to a vehicle for collection agricultural material during an agricultural operation. The vehicle may include a frame; a ground engaging component coupled to the frame, the ground engaging component operable to move along the ground; and a bin defining a volume to receive agricultural material. The bin may include an open end in communication with the volume, a first wall, and a first door coupled to the first wall and movable between an open position and a closed position. The first door may expose a first opening in the first wall as the first door is moved to the open position. The first opening may extend from the open end. The first wall may define a first edge extending along at least a portion of the open end. The first opening may be defined at least partially by a second edge of the first wall, and the second edge may extend from the first edge. The bin may include a second wall adjacent to the first wall. The second wall may define a second opening extending from the open end, and the bin may include a second door coupled to the second wall. The second door may be movable between an open position and a closed position. The second opening may be exposed as the second door is moved to the open position. The first opening and the second opening may be joined to form a continuous opening. An interface between the first wall and the second wall may include a corner of the bin. The bin may include a flexible material extending between adjacent ends of the first wall and the second wall. The flexible material may seal a gap formed between the adjacent ends of the first wall and the second wall when the first wall and the second wall are in the closed position. The first door may be pivotably coupled to the first wall. The first door may be pivotable relative to the first wall about a horizontal axis. The first door may be slideable relative to the first wall. The first door may be slideable relative to the first wall in a direction that includes a vertical component. The first door may be slideable relative to the first wall in a direction that includes a horizontal component. The first door may be formed of a flexible material. Movement of the first door from the closed position to the open position may include movement of the first door from an unfurled configuration into a furled configuration. In the furled configuration, the first door may form a roll defining a horizontal axis. in the furled configuration, the first door forms a roll defining an axis extending in a direction having a vertical component. The first door may include a plurality of panels.

The plurality of panels may be slideable relative to each other to form a stacked configuration when the door is in the open position. Adjacent panels of the plurality of panels may be connected via a hinged connection. The bin may include an actuator coupled to the first door that causes the first door to move between the open position and the closed position.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

Figure 1:
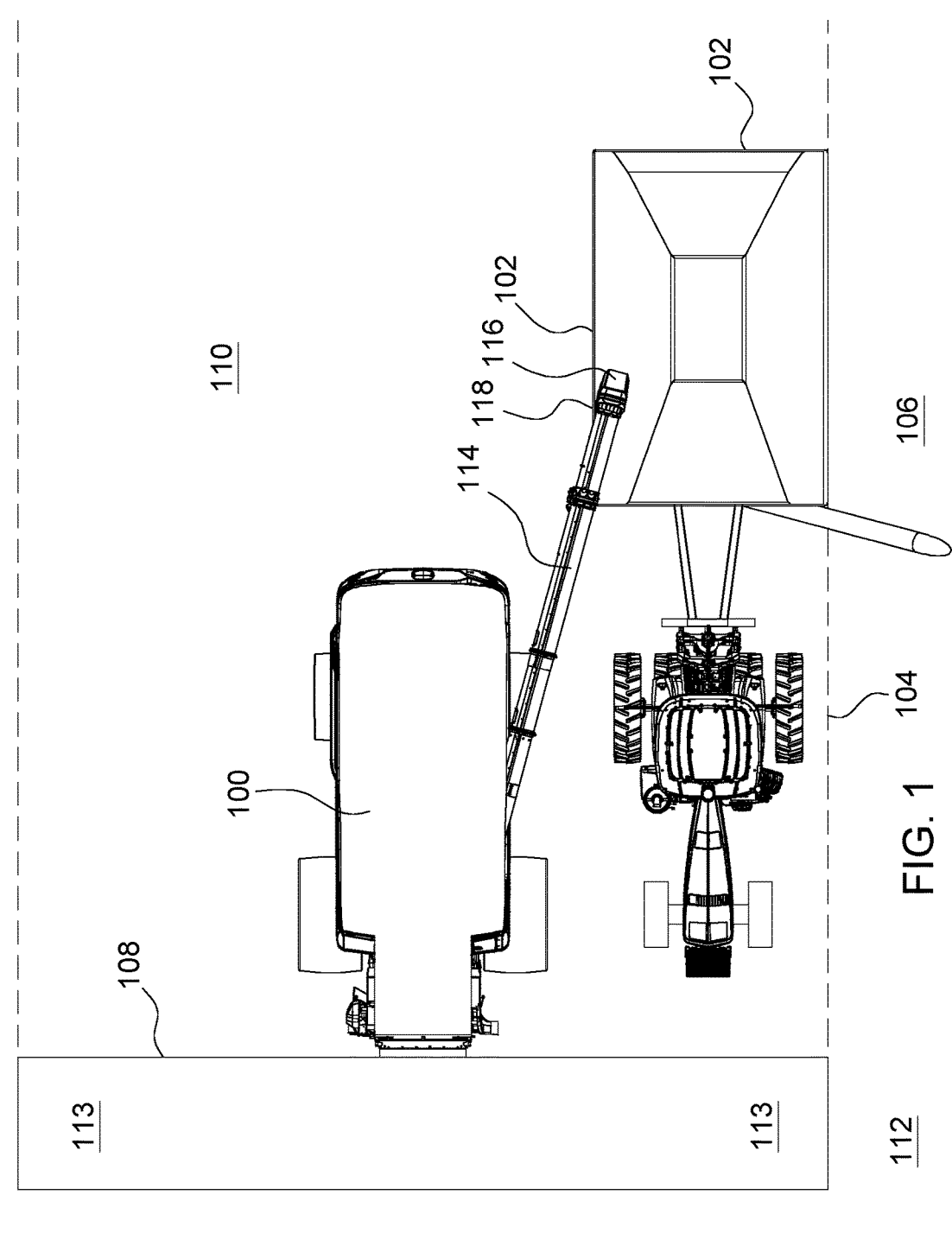
FIG. 1 is a plan view of an example combine harvester and grain cart being pulled by a work vehicle, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Words of orientation, such as "up," "down," "top," "bottom," "above," "below," "leading," "trailing," "front," "back," "forward," and "rearward" that are used in the context of the illustrated examples are used as would be understood by one skilled in the art and are not intended to be limiting to the disclosure. For example, for a particular type of agricultural machine, such as a work vehicle, grain cart, or implement, in a conventional configuration and orientation, one skilled in the art would understand these terms as the terms apply to the particular agricultural machine.

For example, as used herein, with respect to an agricultural machine, such as a work vehicle or grain cart, unless otherwise defined or limited, the term "forward" (and the like) corresponds to a forward direction of travel of the agricultural machine over the ground during normal operation of the agricultural machine. Likewise, the term "rearward" (and the like) corresponds to a direction opposite the forward direction of travel of the agricultural machine.

Also as used herein, with respect to an agricultural machine or components thereof, unless otherwise defined or limited, the term "leading" (and the like) indicates a direction of travel of the agricultural machine when viewed in a conventional orientation on flat ground during normal operation (e.g., the forward direction of travel of a work vehicle transporting an implement). Similarly, the term "trailing" (and the like) indicates a direction that is opposite the leading direction. A conventional orientation represents an agricultural machine being oriented such that normal operation of the agricultural machine can be performed. For example, a conventional orientation may involve having the tracks or wheels of a work vehicle or grain cart contacting the ground in a manner that allows the work vehicle or grain cart to function as intended.

The present disclosure is directed to vehicles used to receive grain or other collected crop material collected during a harvesting operation. These vehicles encompass grain carts, whether self-propelled or towed by another vehicle, such as a tractor. Example grain carts are described in the following disclosure. However, it is within the scope of the present disclosure to cover vehicles other than grain carts.

During a harvesting operation, a combine harvester passes through a field, harvests crop, and processes the harvested crop material, such as to collect grain from the harvested crop. The collected grain is stored in a grain bin onboard of the combine harvester. Grain collected in the grain bin is offloaded, such as when the grain in the grain bin reaches a selected level. The grain is offloaded to a grain cart, for example. In some instances, the combine harvester offloads the grain as the combine harvester continues to move through a field and while continuing to harvest crop. The grain cart travels along with the combine harvester as the grain is being offloaded from the combine harvester into the grain cart. Generally, the combine harvester offloads the collected grain using an unloader that swings outwardly. The unloader includes a conveyor that transports the collected grain and deposits the collected grain into the grain cart, via an open end, from a spout located at an end of the unloader.

Sometimes, a combine harvester may make an initial pass through a new field or portion of a field. The initial or breakthrough pass creates an initial path through the crop that is not adjacent to any other path. Thus, in some instances, standing crop is present on both sides of the initial path. In other instances, obstacles may be present on one side of the path, such as trees, a fence, a road, or other boundary. During such a breakthrough pass into the field or portion of the field, there is space adjacent to the combine harvester that is unoccupied by standing crop. This space is formed by the extend to with the header coupled to the combine harvester extends laterally beyond the lateral extent of the combine harvester. Further, on occasion, the grain bin of the combine harvester reaches a selected level and unloading is desired. However, during a breakthrough pass, there is inadequate space for a grain bin to travel adjacent to the combine harvester while still allowing the unloader to be fully extended to unload the grain to the grain cart.

The present disclosure describes various non-limiting examples of grain carts having one or more movable doors that open to accommodate a portion of an unloader that is partially extended from the combine harvester. A grain cart configured in this way is able to ride adjacent to the combine harvester in a space cleared by a header coupled to the combine harvester during the breakthrough pass.

FIG. 1 is a plan view of an example combine harvester 100 and grain cart 102 being pulled by a work vehicle 104. In the illustrated example, the work vehicle 104 is a tractor. However, other types of work vehicles can be used to pull the grain cart 102. Further, in some instances, the grain cart 102 could be a self-propelled grain cart. FIG. 1 shows the combine harvester 100 performing a breakthrough pass through a field 106. A header 108 coupled to the combine harvester 100 harvests standing crop to form a path 110 through the field 106. Because the breakthrough pass is the first pass through an area of crop, standing crop 112 is present directly ahead of the header 108 and adjacent to both lateral sides 113 of the header 108.

An unloader 114 is shown extended from the combine harvester 100. Particularly, in the illustrated example, the unloader 114 is partially extended. Typically, a vertical distance above the ground of a distal end 116 of the unloader rises increases as the unloader 114 extends from the combine harvester 100. When fully extended, the distal end 116 is positioned above the grain cart. However, because the grain cart 102 is closer to the combine harvester 100 during a breakthrough pass, the vertical height of the distal end 116 of the unloader 114 when partially extended is less than the vertical distance when fully extended. To accommodate for this reduced vertical distance of the distal end 116 of the unloader 114 above the ground, the grain cart 102 includes one or more doors 118 to permit passage of the unloader 114 beyond a side 120 of the grain cart 102.

Figure 2:
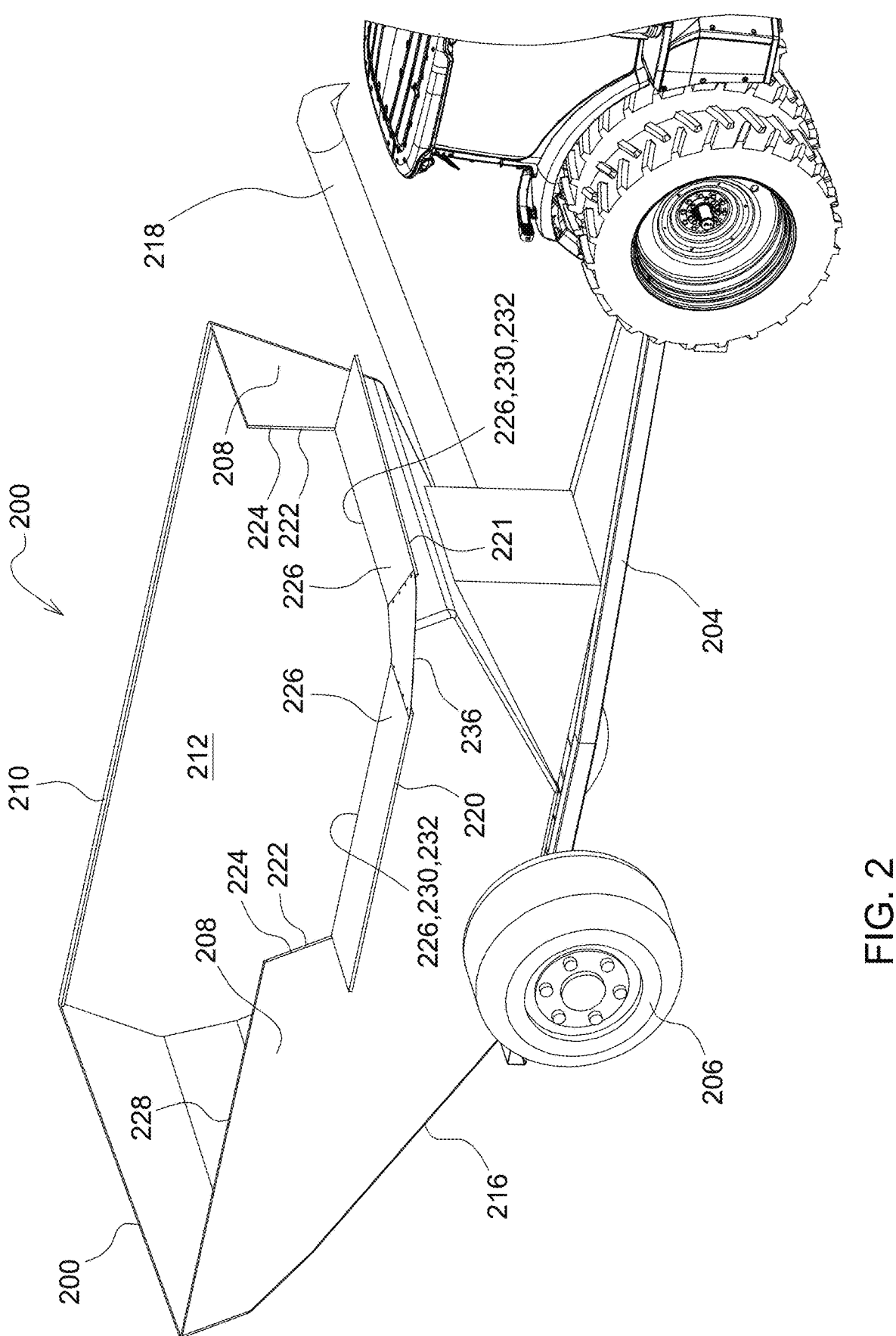
FIG. 2 is perspective view of an example grain cart, according to some implementations of the present disclosure

FIG. 2 is a perspective view of an example grain cart 200. The grain cart 200 includes a bin 202 mounted on a frame 204 and ground engagement components 206. In the illustrated example, the ground engaging components 206 include wheels and tire that roll to move the grain cart 200 over the ground. In other implementations, the ground engaging components 206 may be other devices, such as tracks, to move the grain cart 200 over the ground. In some instances, the grain cart 200 includes one or more scales to measure a weight or mass of the grain deposited into the bin 202.

Figure 3:
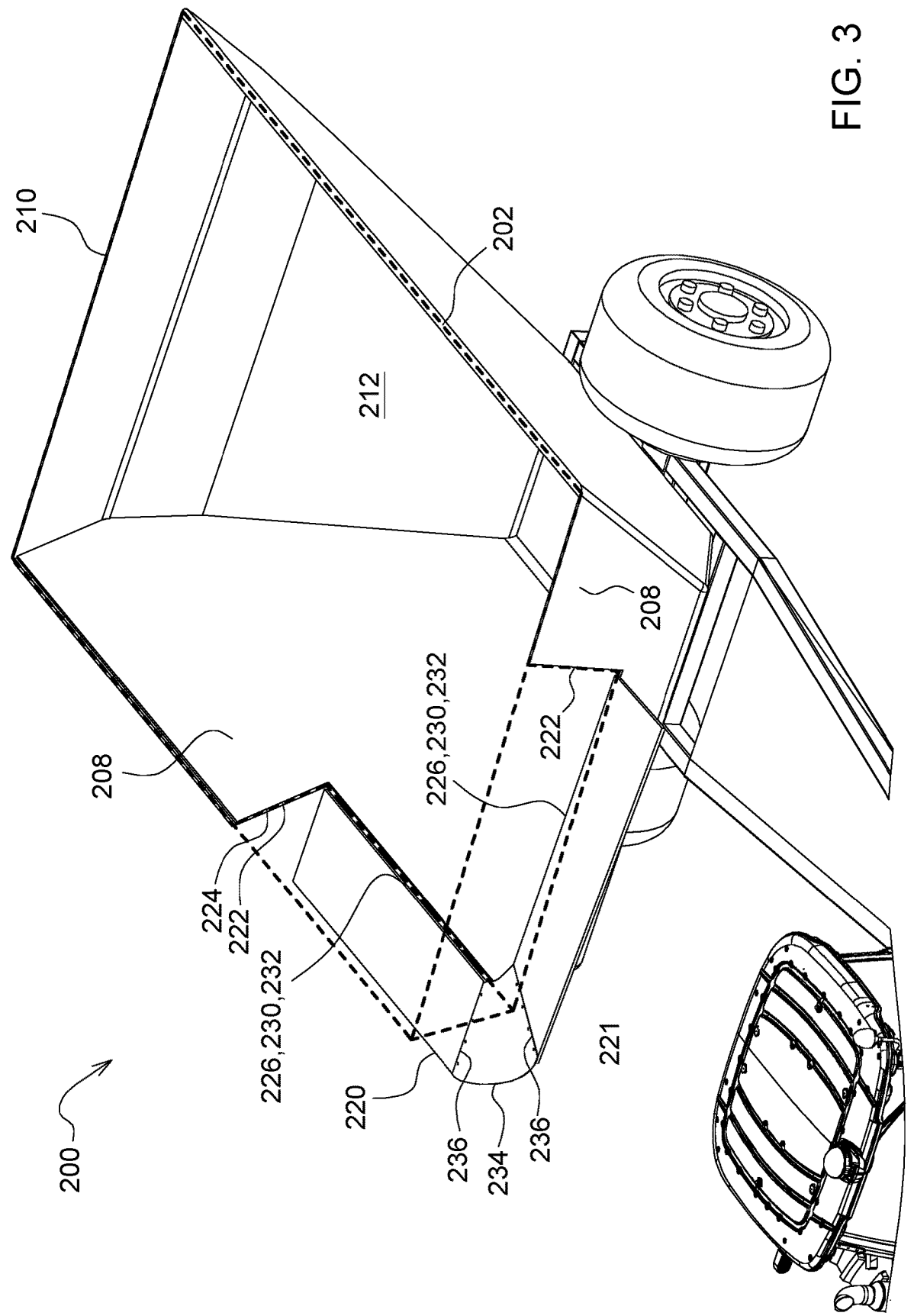
FIG. 3 is an oblique view of another example grain cart having hinged doors pivotably about horizontal axes, according to some implementations of the present disclosure.

The bin 202 includes a plurality of walls 208 and an open end 210 (illustrated by dashed lines in FIG. 3). The bin 202 defines a cavity 212 that is open at the open end 210. The open end 210 allows for material, such as grain being unloaded from a combine harvester, to be deposited in the cavity 212. In some instances, the grain cart 200 may have a continuous wall that defines the cavity 212. For example, the single wall may have a curved, continuous shape that, along with a floor, defines the cavity 212. In other instances, the grain cart 200 may have a single continuous form that defines the lateral sides and base of the bin 202. Thus, grain carts within the scope of the present disclosure may have different wall configurations than the example shown in FIG. 2.

In the illustrated example, the grain cart 200 includes four walls 208 that have a tapered shape to define a hopper 216 at a lower portion 217 of the bin 202. As explained earlier, the grain cart 200 may include a different number of walls, wall with different shapes, or both. The hopper 216 funnels grain contained within the cavity 212 to a conveyor 218 used to unload the grain contained within the bin 202.

Two of the walls 208 include door 220, 221, respectively, that are movable between a closed position and an open position. FIG. 2 shows the doors 220, 221 in the open position. With the doors 220 moved into the open position, an unloader of a combine harvester, such as the unloader 114, described above, can extend into the cavity 212 of the bin 202 to unload grain.

Each of the walls 208 define an opening 222 (shown in dashed lines). In FIG. 3, the openings 222 are illustrated with dashed lines. The openings 222 are adjacent to and extend from the open end 210. In the illustrated example, the openings 222 include a generally vertically extending edge 224 and a generally horizontally extending edge 226. In other implementations, edges having other shapes may define the openings 222. The edge 224 extends from an edge 228 of the wall 208 that defines, in part, the open end 210. Thus, the openings 222 define a notch in the respective walls 208.

The doors 220, 221 are coupled to the respective walls 208 via a hinged connection 230. The doors 220, 221 are pivotable about a horizontal axis 232 defined by the hinged connection 230. Thus, in the closed configuration, the doors 220, 221 are pivoted upwards about the horizontal axis 232 so that the openings 222 are covered. In the open position, the doors 220, 221 are pivoted downwards about the horizontal axis 232 so that the openings 222 are exposed.

Figure 4:
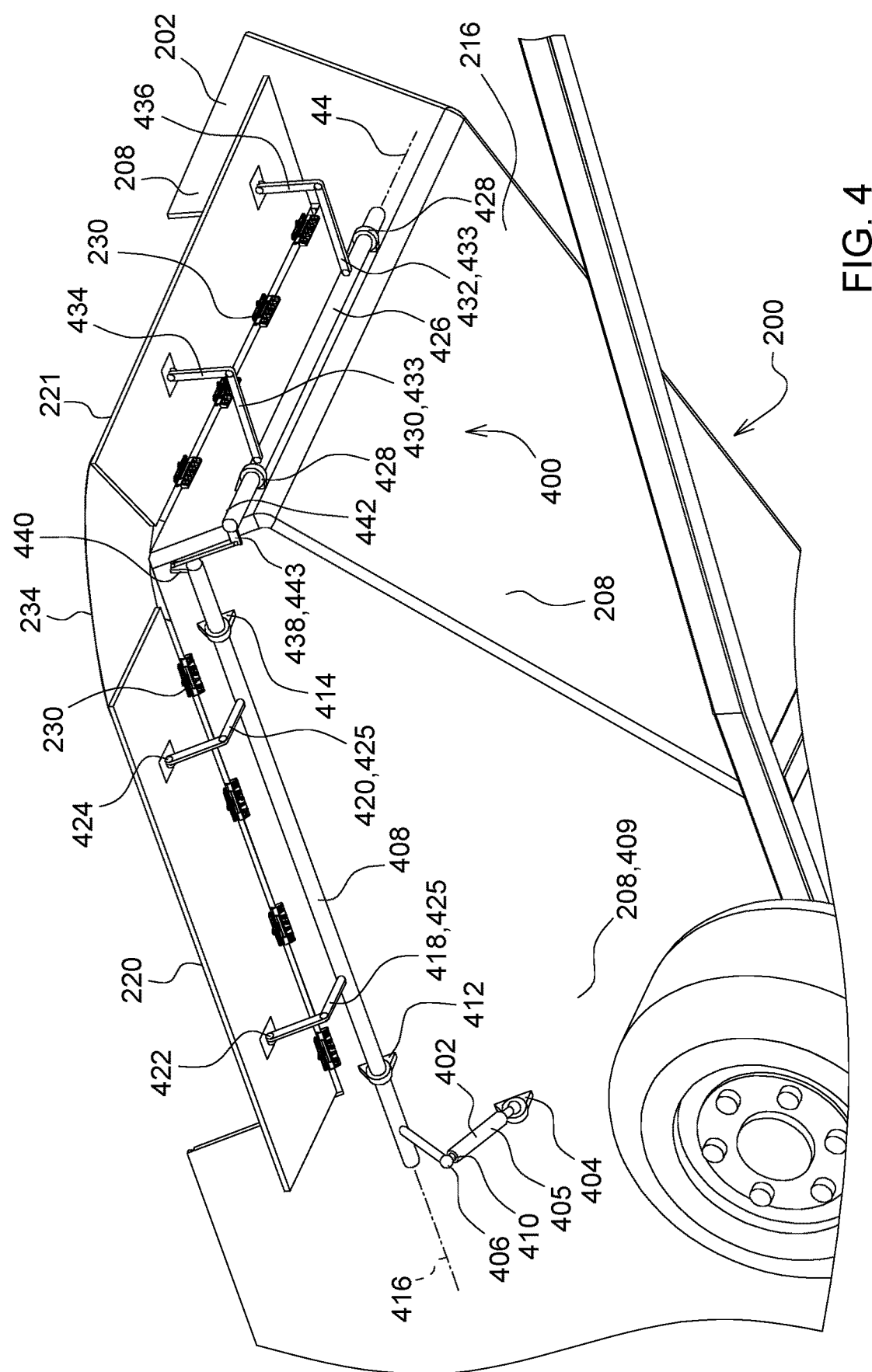
FIG. 4 is another oblique view of the grain cart of FIG. 3.

FIGS. 3 and 4 are detailed oblique views of the grain cart of FIG. 2. FIG. 3 shows the doors 220 in the open position, exposing the openings 222. A flexible seal 234 is secured to at least one of the doors 220, 221, such as to an end 236 of the doors 220, 221. In some instances, the seal 234 is attached to both doors 220, 221. In other instances, the seal 234 is coupled to one, but not both, of the doors 220, 221. In other implementations, the seal 234 is coupled to one or both of the doors 220, 221 at a location other than the end 236. The seal may be formed from a flexible material, such as a polymeric material (e.g., rubber) or a woven or textile material (e.g., canvas).

In the illustrated example, the seal 234 lies flat when the doors 220, 221 are moved into the open position and, in the closed position, the seal 234 changes shape (e.g., distorts or flexes) to conform to a corner defined by the ends 236 of the doors 220, 221. In this way, the seal 234 fills any gap that may exist between the ends 236 when the doors 220, 221 are placed into the closed position, thereby preventing any grain from escaping from the grain cart 200 between the ends 236 of the doors 220, 221. In some implementations, the seal 234 may be omitted. For example, in some instances, the doors 200 and 221 may be arranged such that, when closed, a gap does not exist or is of a size that avoids grain losses.

FIG. 4 shows an actuation system 400 used to move the doors 220, 221 between the open position and the closed position. The example actuation system 400 represents an external actuation system in that components of the actuation system 400 are external to the cavity 212. That is, components of the actuation system 400 are provided on or are mounted to exterior surfaces of the bin 202. In the illustrated example, the actuation system 400 includes an actuator 402 disposed on an exterior surface 409 of the wall 208 and pivotably mounted to a mount 404 of the bin 202 at a first end 405 and mounted to an arm 406 of a shaft 408 at a second end 410. In other implementations, the actuators 402 can be provided at other locations, such as embedded in a wall or other component of the grain cart 200. Although the actuator 402 is described as a linear actuator, such as a hydraulic, pneumatic, or electric linear actuator, the actuator 402 encompasses other types of actuators. For example, actuators within the scope of the present disclosure include rotary actuators. The shaft 408 extends along a wall 208 of the bin 202 to which the door 202 is connected. In some implementations, the first and second ends 405 and 410 of the actuator 402 have pinned connections. The shaft 408 is pivotably mounted to the wall 208 via couplings 412 and 414 that provide for rotation of the shaft 408 about an axis 416. Although two couplings 412 are shown, fewer or additional couplings could be used. The couplings 412 may include a bearing, such as a roller bearing, and a bracket to secure the bearing to the bin 202. In some instances, a bearing may be omitted. The shaft 408 includes arms 418 and 420 that connect to links 422 and 424. The links 422 and 424 are pivotably coupled to the arms 418, 420 and the door 220. The arms 418, 420 and respective link 422, 424 form linkages 425 that function to pivot the door 220 about the hinged connection 230 to place the door 220 in the closed or open positions in response to extension or retraction of the actuator 402. Although two linkages 425 are shown, in other implementations, additional or fewer linkages 425 could be used.

The actuation system 400 also includes a shaft 426 extending along an adjacent wall 208. The shaft 426 extends along the wall 208 and is coupled to the wall 208 via couplings 428 that may be similar to couplings 412. Although two couplings 428 are shown, additional or fewer couplings 428 may be used. The shaft 426 includes arms 430 and 432 that are coupled to respective links 434 and 436. The link 434 and 436 are pivotably coupled to the arms 430 and 432 and the door 221. The pivotably coupled links 434 and 436 and arms 430 and 432 form linkages 433 that function to pivot the door 221 about the hinged connection 230 to move the door 221 between the open and closed positions. Although two linkages 433 are shown, in other implementations, additional or fewer linkages 433 could be used. In the illustrated example, the hinged connections 230 are shown as a plurality of hinges. In some instances, the hinged connections 230 may be a single continuous hinge. Other types of pivoting connections are also contemplated.

The shaft 426 is coupled to the shaft 408 by a link 438. The link 438 is coupled to an arm 440 of the shaft 408 and an arm 442 of the shaft 426. The link 438 and arms 440 and 442 form a linkage 443 that operates to cause the shaft 426 to pivot about an axis 444 in response to rotation of the shaft 408. Thus, actuation of the actuator 402 operates to pivot the shafts 408 and 426 simultaneously about respective axes 416, 444 to open and close the doors 220 and 221. In other implementations, more than one actuator is used. For example, each door 220 and 221 has an associated actuator or actuators to independently move the respective door 220 or 221 between the open position and the closed position.

Although one example of an actuation system is described, other types of actuation system may be used to reposition the doors, such as between the open and closed positions, and are within the scope of the present disclosure.

Figures 5, 6:
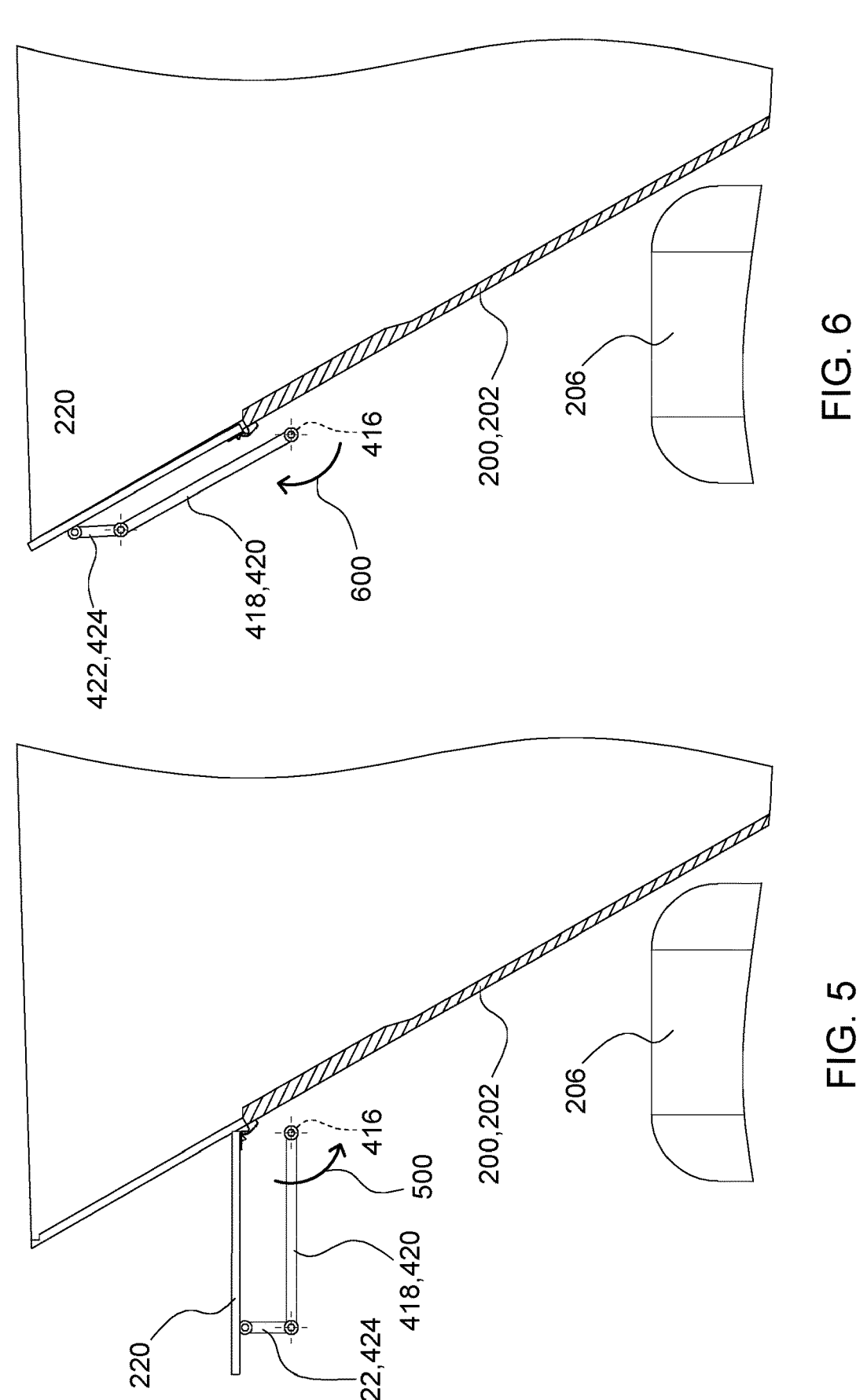
FIGS. 5 and 6 are detail views of the grain cart of FIG. 3.

FIGS. 5 and 6 are front, detail views of the grain cart 200 showing movement of the door 200 between the open and closed positions. FIG. 5 shows the door 200 in the open position with the arms 418 and 420 having pivoted in the direction of arrow 500. FIG. 6 shows the door in the closed position with the arms 418 and 420 having pivoted in the direction of arrow 600.

Figure 7:
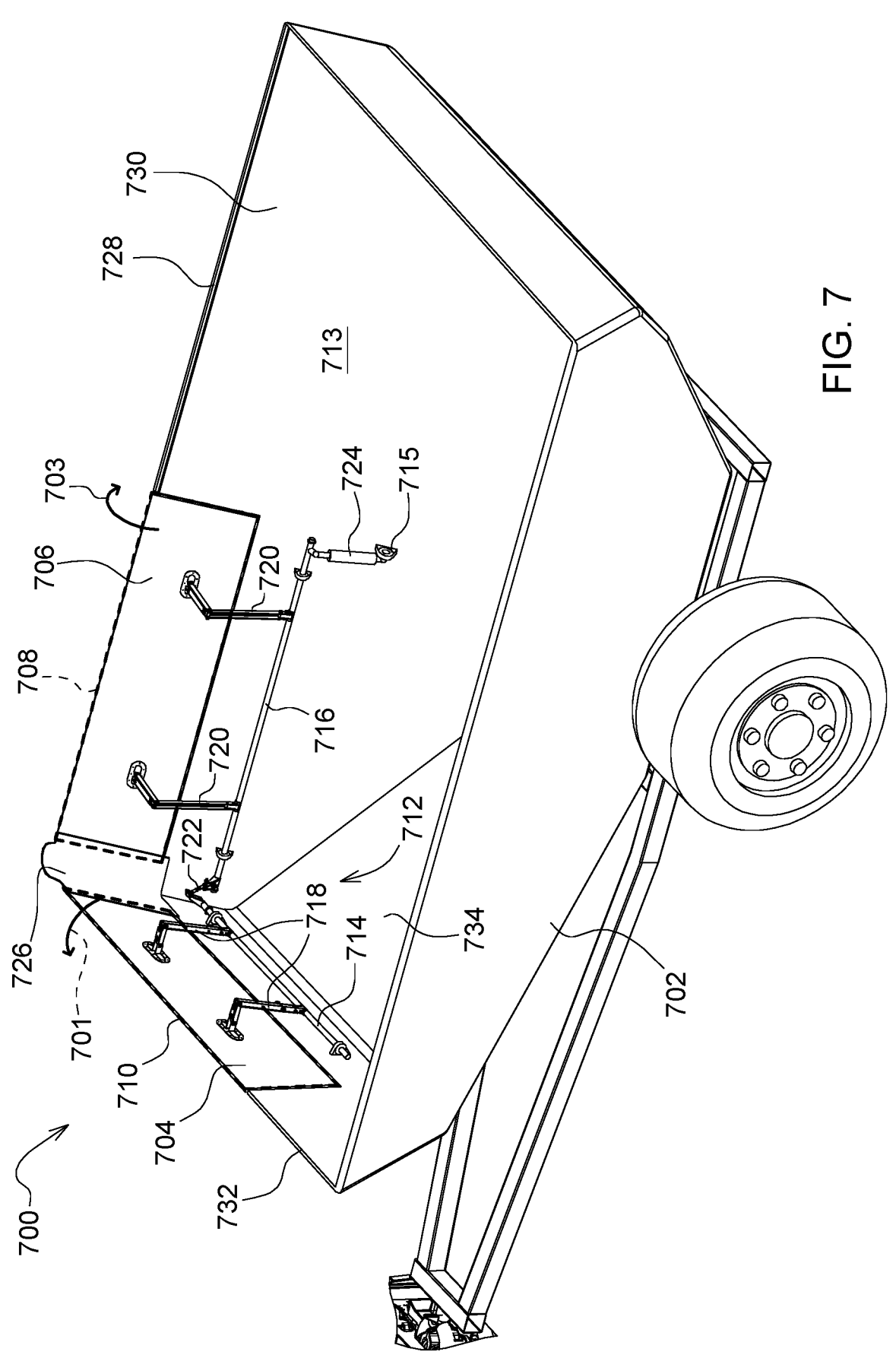
FIG. 7 is an oblique view of another example grain cart having hinged doors pivotable about horizontal axes, according to some implementations of the present disclosure.

FIG. 7 is another example grain cart 700 that is similar to the grain cart 200, described earlier. Like the grain cart 200, the grain cart 700 includes a bin 702 having two doors 704 and 706 that are movable between a closed position and an open position in which openings 708 and 710 (indicated by dashed lines) are exposed. From the closed position, the doors 704 and 706 move in the directions of arrow 701 and 703, respectively, to the open position. From the open position, the doors 704 and 706 move in a direction opposite the arrows 701 and 703, respectively, to the closed position.

The grain cart 700 varies from that shown in FIG. 4 in that the grain cart 700 includes an actuation system 712 similar to the actuation system 400, described earlier, except that components of the actuation system 712 is located inside of a cavity 713 formed by the bin 702. Thus, the actuation system 712 used to move the doors 704 and 706 between the open and closed positions is located inside of a cavity 713 formed by bin 702.

Similar to the actuation system 400, the actuation system 712 includes shafts 714 and 716 that are coupled to doors 704 and 706, respectively, via linkages 718 and 720. The linkages 718 and 720 are similar to linkages 425 and 433, described earlier. The shafts 714 and 716 are connected by a linkage 722, similar to linkage 443. An actuator 724, such as a linear actuator or a rotary actuator, is used to pivot the shafts 714 and 716 to move the doors 704 and 706 between the open and closed positions. The actuator 724 may be similar to actuator 402. In the illustrated example, a single actuator, actuator 724, is used to move the doors 704 and 706 simultaneously between the open position and the closed position. In other implementations, more than one actuator is used, such as one actuator to move each of the doors 704 and 706 between the open and closed positions. Further, the actuator 724 is shown located inside of the cavity 713 coupled to a mount 715 that is coupled to an interior surface 730 of wall 728. In other implementations, the actuator 724 is coupled to wall 732, such as an interior surface 734 of the wall 732. In other implementations, the actuator 724 is located external to the cavity 713. Further, the actuator 724 may be located in or adjacent another component of the grain cart 700. The grain cart 700 also includes a seal 726 similar to the seal 234. In some implementations, the seal 726 is omitted. Although an example actuation system 712 is described, other types of actuation systems may also be used to move the doors 704 and 706 between the open position and the closed position.

Figure 8:
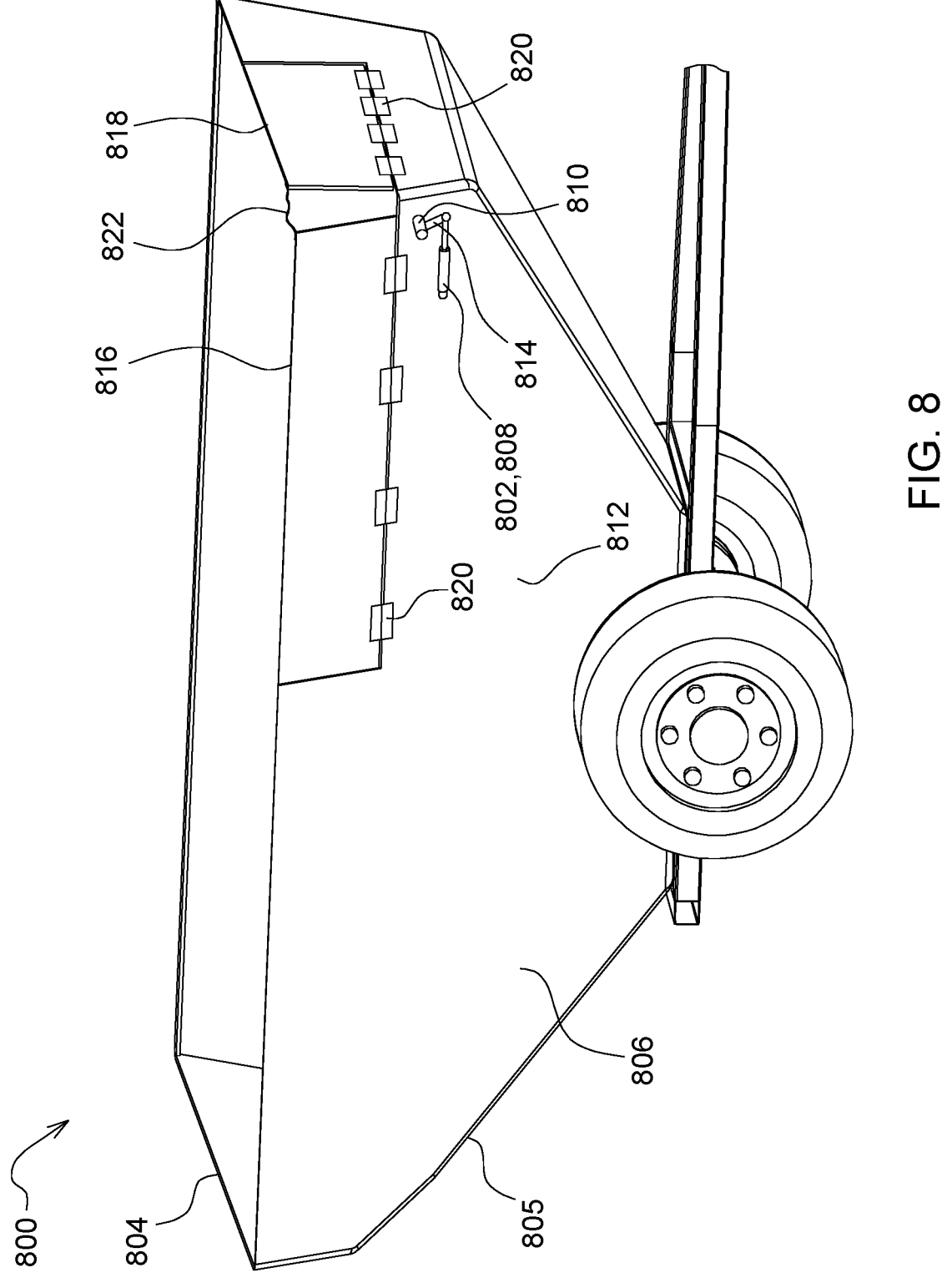
FIGS. 8 and 9 are detail views of another example grain cart having hinged doors pivotable about horizontal axes, according to some implementations of the present disclosure.
Figure 9:
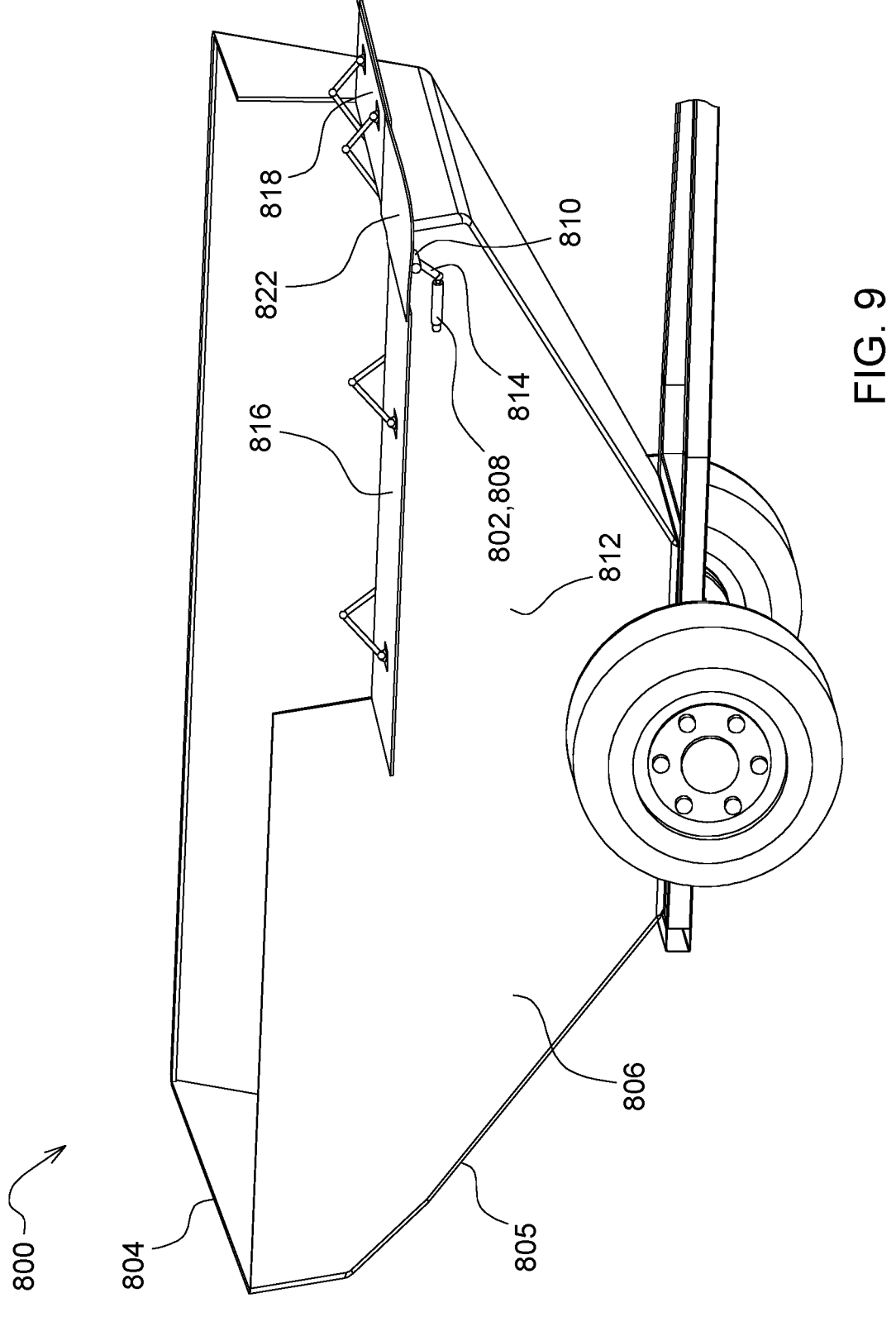

FIGS. 8 and 9 are detail views of another example grain cart 800 that is similar to grain cart 700. The grain cart 800 varies in that the grain cart 800 includes an actuator 802 located outside of cavity 804 formed by a bin 805 of the grain cart 800. The actuator 802 is disposed adjacent to an exterior surface 806 and is coupled to and actuates an actuation system 808 that is similar to the actuation system 712 located inside of the cavity 804.

A shaft 810 of the actuation system 808 extends through wall 812 and is coupled to the actuator 802 via an arm 814 extending from the shaft 810. In the illustrated example, with the actuator 802 in the extended position, doors 816 and 818 are in the closed position, as shown in FIG. 8. In response to retraction of the actuator 802, the doors 816 and 818 pivot about hinged connections 820 to move the doors 816 and 818 into the open position, as shown in FIG. 9. In other implementations, the actuator 802 is arranged such that the doors 816 and 818 are maintained in the closed position when the actuator 802 is retracted, and the doors 816 and 818 are moved to the open position when the actuator 802 is extended. Other arrangements are also possible. Further, the example actuator 802 is a linear actuator, such as a hydraulic, pneumatic, or electric linear actuator. However, actuator within the scope of the present disclosure include rotary actuators. The grain cart 800 also includes a seal 822 similar to seal 726 and 234. In other implementations, the seal 822 is omitted.

Figure 10:
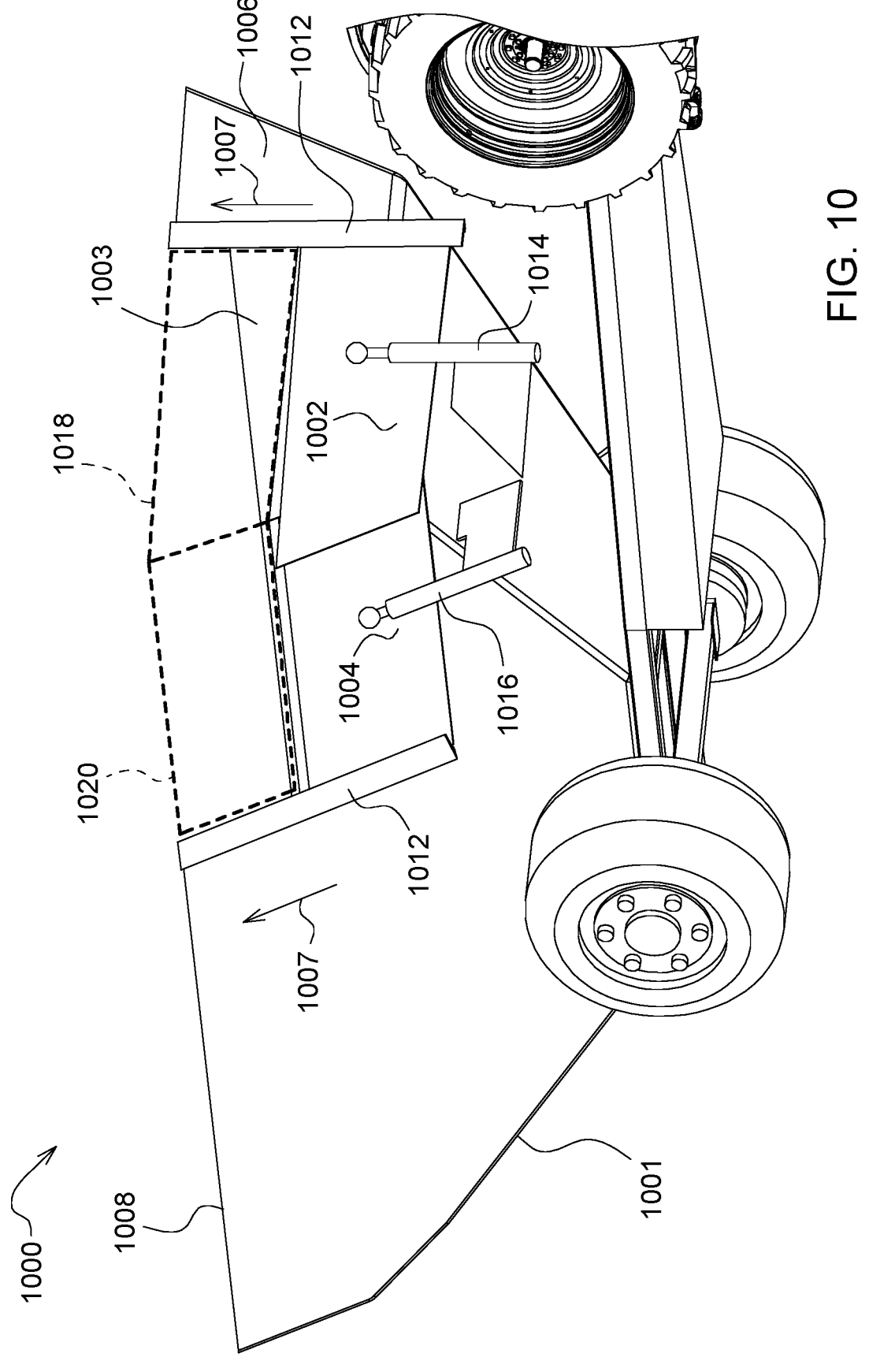
FIGS. 10 and 11 are oblique views of another example grain cart having sliding doors slideable in a generally vertical direction, according to some implementations of the present disclosure.
Figure 11:
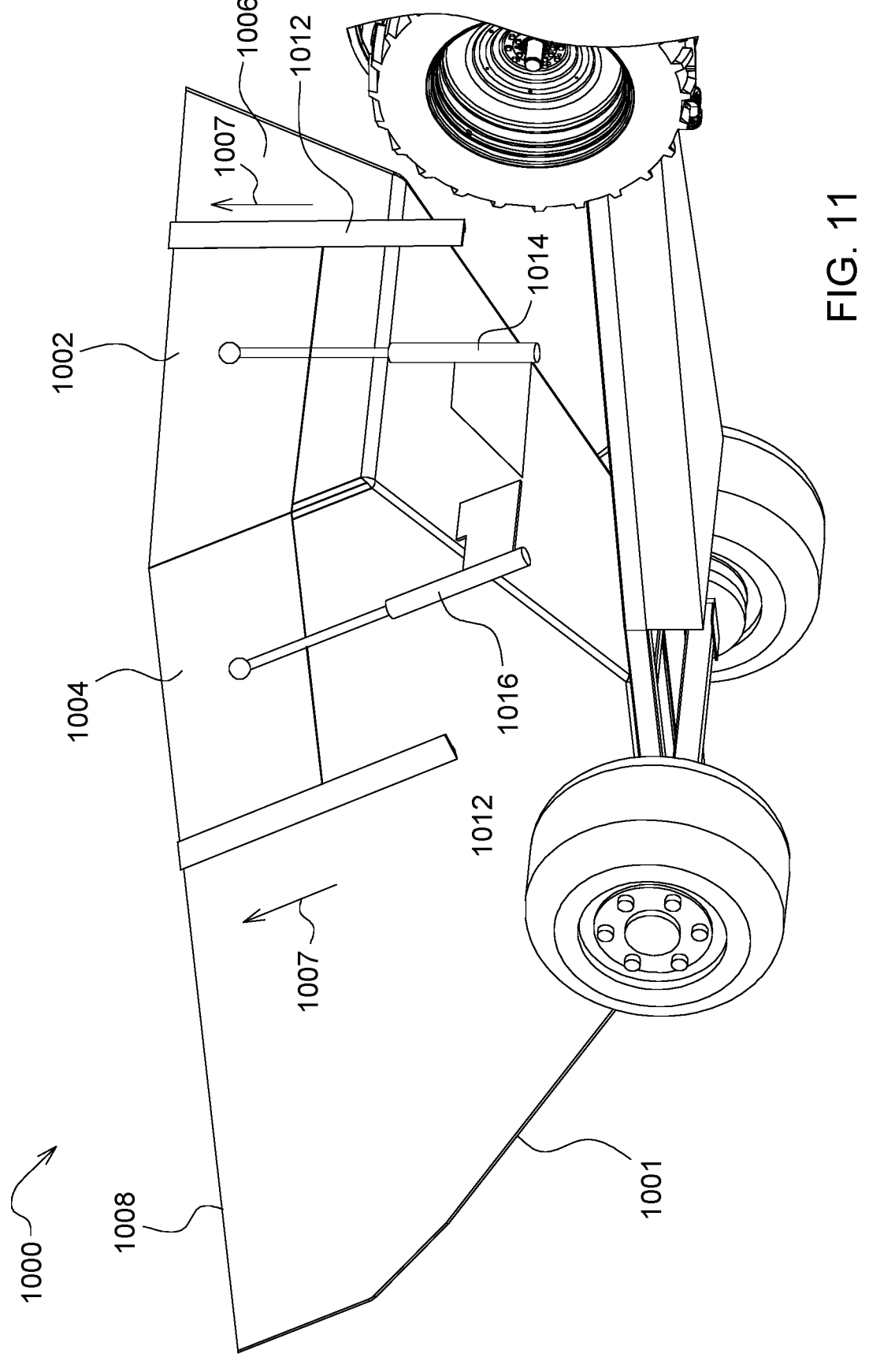

FIGS. 10 and 11 illustrate another example grain cart 1000 that has sliding doors 1002, 1004 movable between an open position and a closed position. The grain cart 1000 is similar to the grain carts 200 and 700 and includes a bin 1001 defining a cavity 1003. However, the doors 1002 and 1004 of the grain cart 1000 are slideable between an open position and a closed position. For example, in some instances, the doors 1002 and 1004 slide generally vertically while remaining adjacent to the walls 1006 and 1008, respectively, of the bin 1001 of the grain cart 1000. For example, in the illustrated example, the walls 1006 and 1008 are sloped. Thus, in some implementations, the doors 1002 and 1004 slide along the exterior surfaces of the walls 1006 and 1008 in a generally vertically direction. That is, although the doors 1002, 1004 move in an angled direction as the doors 1002 and 1004 slide along the exterior surfaces of the walls 1006 and 1008, the direction of movement includes a vertical component. The doors 1002 and 1004 ride is tracks, rails, grooves, or slots (collectively referred to as "tracks" 1012) formed into or included on the walls 1006 and 1008.

The doors 1002 and 1004 move in response to actuation of actuators 1014 and 1016, respectively. Referring to FIG. 10, with the actuators 1014 and 1016 in a retracted configuration, the doors 1002 and 1004 are in a lower, open position, exposing openings 1018 and 1020 (identified by dashed lines), formed in walls 1006 and 1008, respectively. The actuators 1014 and 1016 may act simultaneously to raise (movement in the direction of arrows 1005) or lower (movement in the direction of arrows 1007) the doors 1002 and 1004 together or separately to raise or lower the doors 1002 and 1004 individually. In the illustrated example, the actuators 1014 and 1016 are linear actuators, such as electrical, hydraulic, or pneumatic linear actuators. In other implementations, other types of actuators can be used, such as rotary actuators, to move the doors 1002 and 1004 between the open and closed positions. Although shown exterior of the cavity 1003, in other implementations, the actuators 1014 and 1016 can be located interior of the cavity 1003 or within the respective walls or another component of the grain cart 1000.

Figure 12:
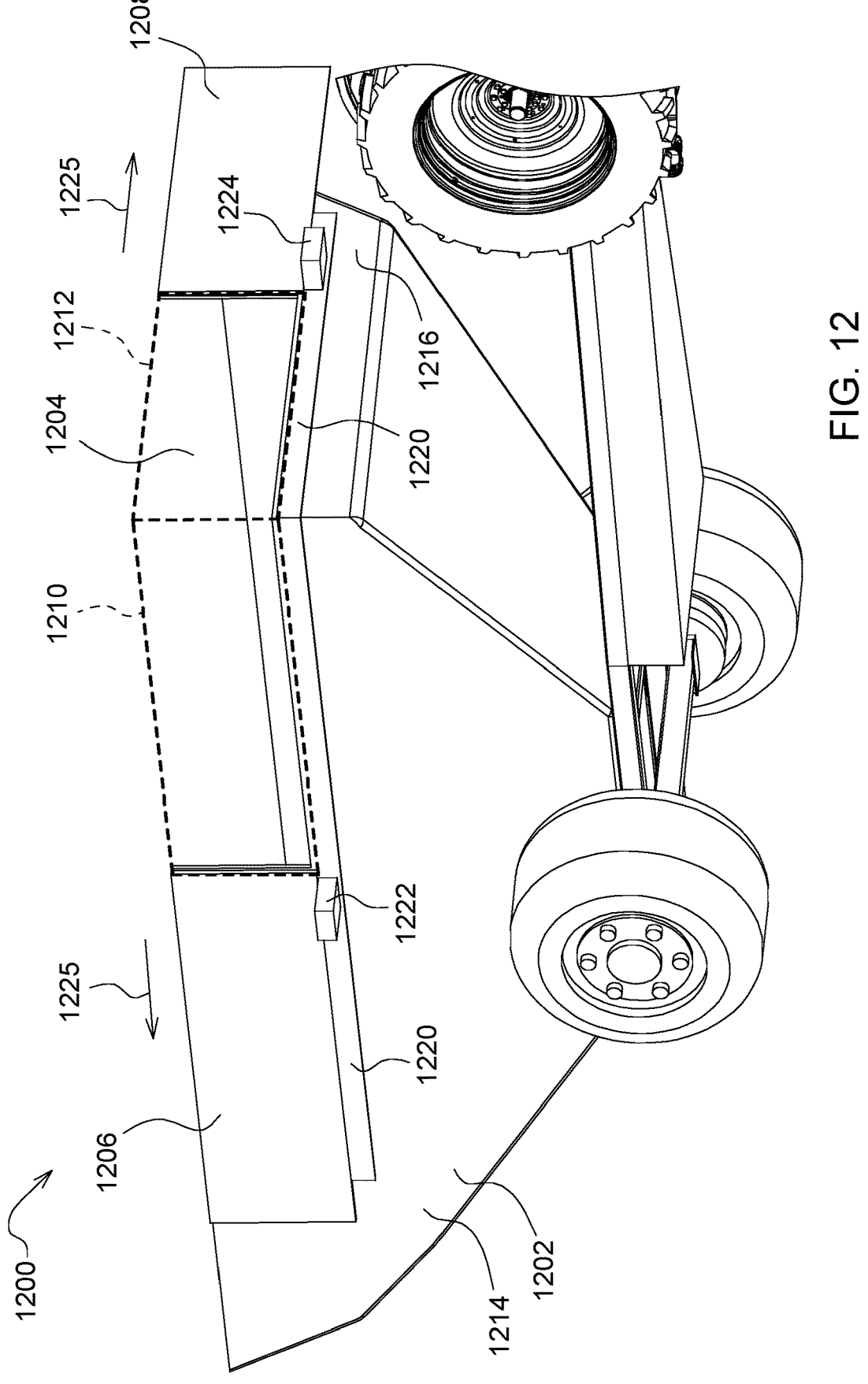
FIGS. 12 and 13 are oblique views of another example grain cart having sliding doors slideable in a generally horizontal direction, according to some implementations of the present disclosure.
Figure 13:
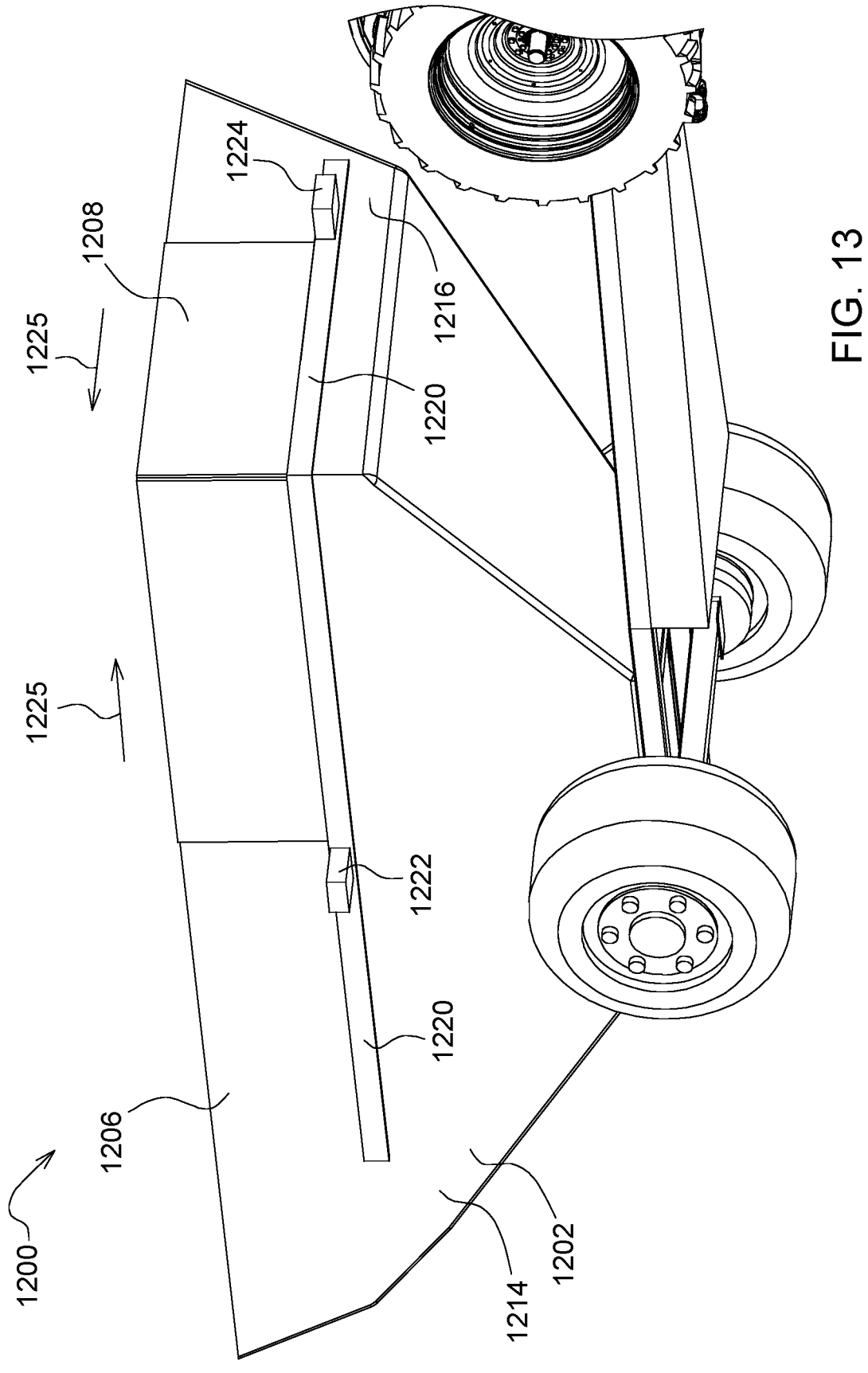

FIGS. 12 and 13 illustrate another example grain cart 1200 including a bin 1202 that defines a cavity 1204. The grain cart 1200 is similar to grain carts 200, 700, 800, and 1000. Here, though, the grain cart 1200 includes doors 1206 and 1208 that slide horizontally to move the doors 1206 and 1208 between an open position and a closed position to expose openings 1210 and 1212, indicated by dashed lines. The doors 1206 and 1208 slide along walls 1214 and 1216, respectively, between the open and closed positions. The doors 1206 and 1208 slide within tracks, rails, grooves, or slots (collectively referred to as "tracks" 1220) formed into or included on the walls 1214 and 1216.

The doors 1206 and 1208 are movable in response to actuation of actuators 1222 and 1224, respectively. The actuators 1222 and 1224 may act simultaneously to open (movement in the direction of arrows 1225) or close (movement in the direction of arrows 1227) the doors 1206 and 1208 together or separately to open or close the doors 1206 and 1208 individually. In some implementations, the actuators 1222 and 1224 are linear actuators, such as electric, hydraulic, or pneumatic linear actuators. In other implementations, other types of actuators can be used, such as rotary actuators. In some instances, rotary actuators may include couplings such as a rack and pinion coupling, a ball screw coupling, a friction roller coupling, or a cable and pulley coupling. FIG. 12 shows the doors 1206 and 1208 in the open position, exposing the openings 1210 and 1212, and FIG. 13 shows the doors in the closed position, concealing the openings 1210 and 1212. Although shown exterior of the cavity 1204, in other implementations, the actuators 1222 and 1224 can be located interior of the cavity 1204 or within the respective walls 1214 and 1216 or another component of the grain cart 1200.

Figure 14:
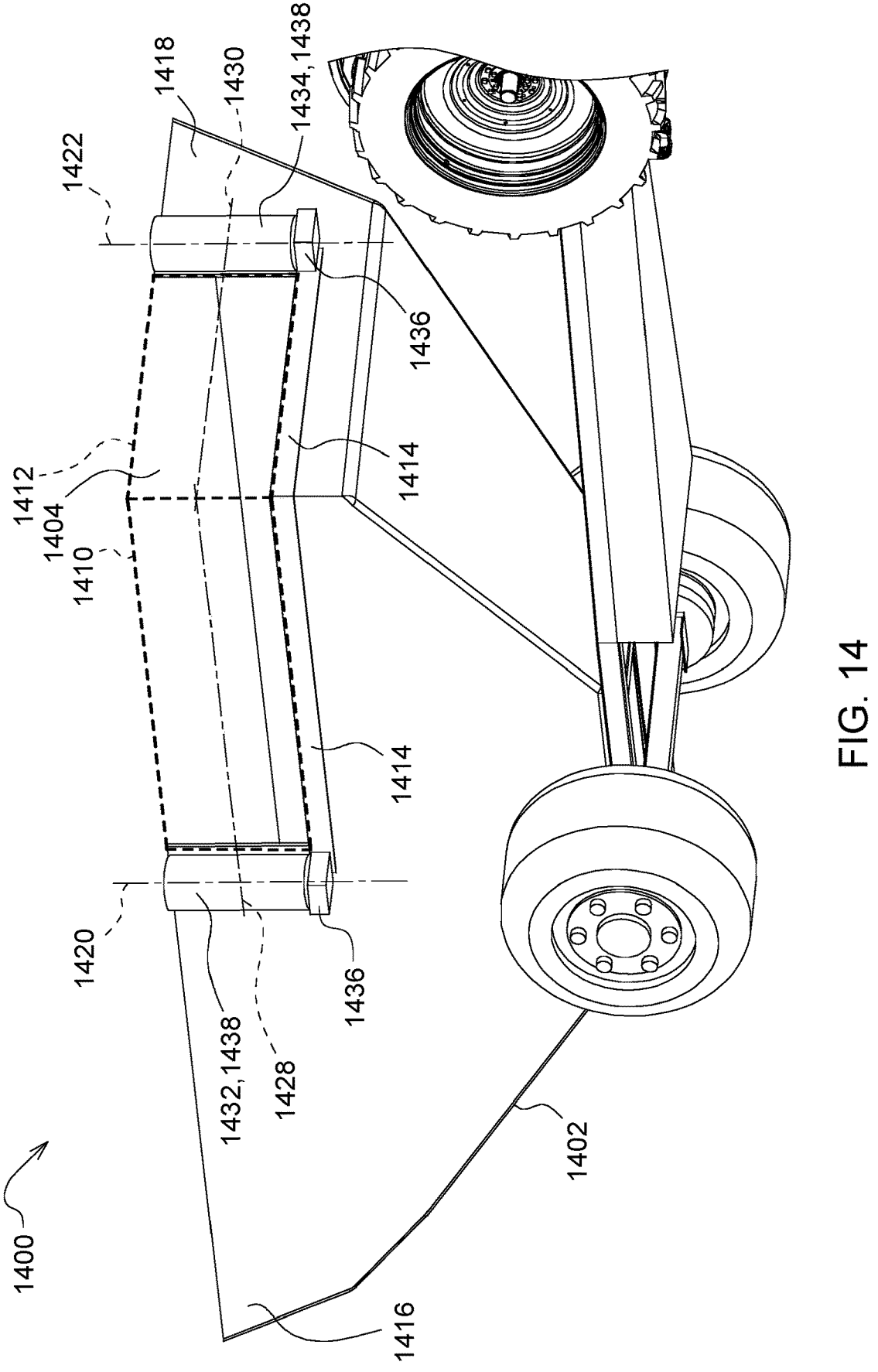
FIGS. 14 and 15 are oblique views of another example grain cart having doors that can be furled and unfurled into and from a roll, according to some implementations of the present disclosure.
Figure 15:
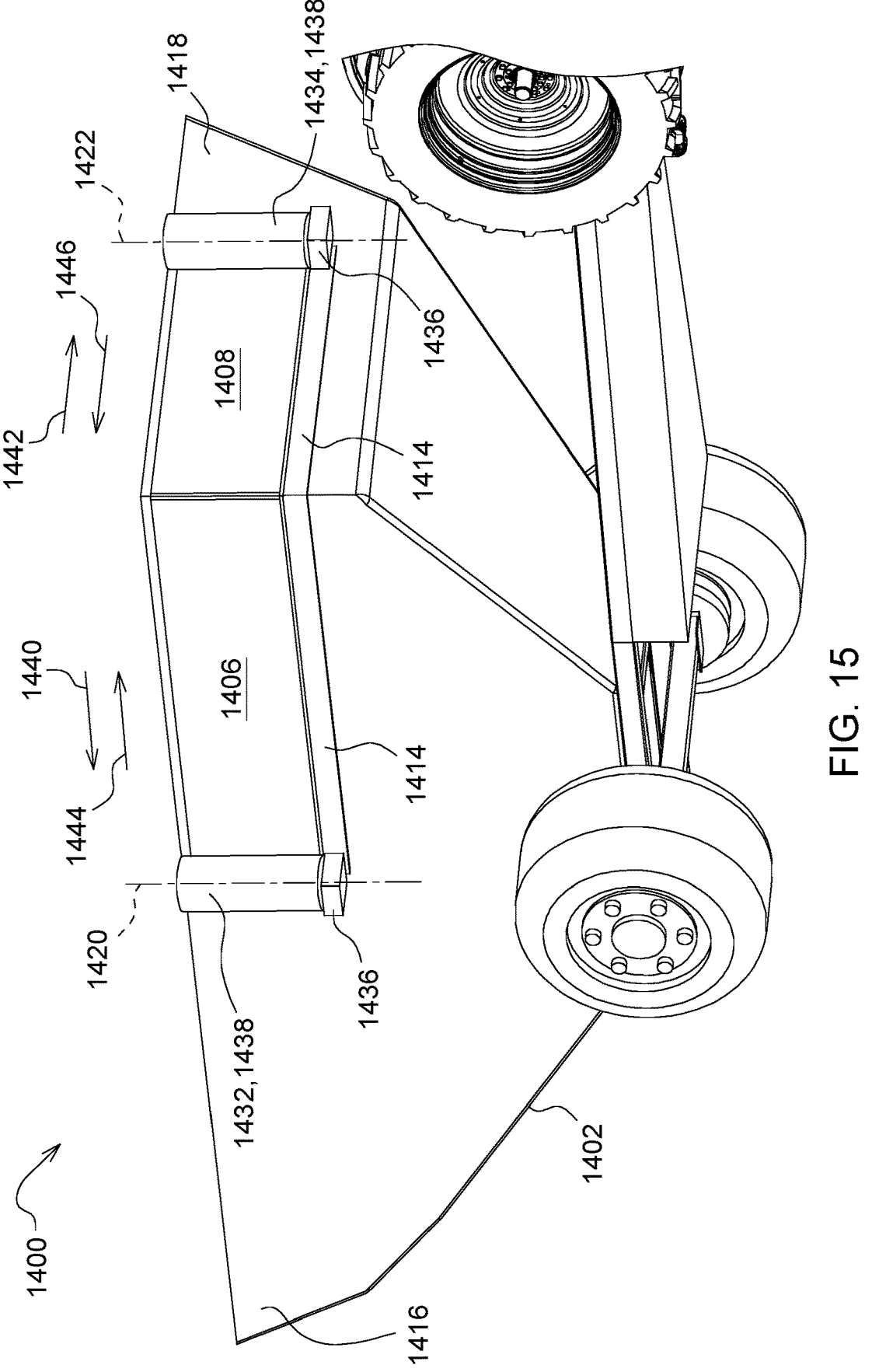

FIGS. 14 and 15 illustrate another example grain cart 1400 having a bin 1402 that defines a cavity 1404. The grain cart 1400 is similar to grain carts 200, 700, 800, 1000, and 1200 except that the grain cart 1400 includes doors 1406 and 1408 that can be furled into a roll to place the doors 1406 and 1408 into an open position. In the open position, the doors 1406 and 1408 expose openings 1410 and 1412 (illustrated in dashed lines). In the closed position, the doors 1406 and 1408 conceal the openings 1410 and 1412. The doors 1406 and 1408 are movable along tracks, rails, grooves, or slots (collectively referred to as "tracks" 1414) formed into or included on the walls 1416 and 1418. In some instances, the doors 1406 and 1408 have flexibility in one direction about axes 1420 and 1422, respectively, such that the doors 1406 and 1408 can be furled or rolled up. However, in some instances, the doors 1406 and 1408 have reduced flexibility in another direction, such as about being flexible about axes 1428 and 1430.

The doors 1406 and 1408 are movable between the open position (shown in FIG. 14) and the closed position (shown in FIG. 15) in response to operation of an actuator assemblies 1432 and 1434, respectively. In the illustrated example, the actuator assemblies 1432 and 1434 include an actuator 1436 and a housing 1438. The doors 1406 and 1408 can be rolled up about the axes 1420 and 1422, respectively, in housings 1424 and 1426, respectively. In some implementations, the doors 1406 and 1408 are furled on a shaft disposed within the respective housings 1424 and 1426.

Actuators 1436 operate to extend or retract the doors 1406 and 1408 along the tracks 1414. The actuators 1436 move the doors 1406 and 1408 in the direction of arrows 1440 and 1442, respectively, when moving the doors 1406 and 1408 into the open position. Similarly, the actuators 1436 move the doors 1406 and 1408 in the direction of arrows 1444 and 1446, respectively, when moving the doors 1406 and 1408 into the closed position. In some implementations, when the doors 1406 and 1408 are unfurled into the extended or closed position, the doors 1406 and 1408 conform to a shape of corresponding walls 1416 and 1418. For example, when extended into the closed position, the doors 1406 and 1408 may form an extension of surfaces of the walls 1416 and 1418, respectively. In some implementations, the actuators 1436 are rotary actuators, such as electric, hydraulic, or pneumatic rotary actuators. However, in other implementations, other types of actuators may be used. Although shown exterior of the cavity 1404, in other implementations, the actuators 1636 can be located interior of the cavity 1404 or within the respective walls 1416 and 1418 or another component of the grain cart 1400.

Figure 16:
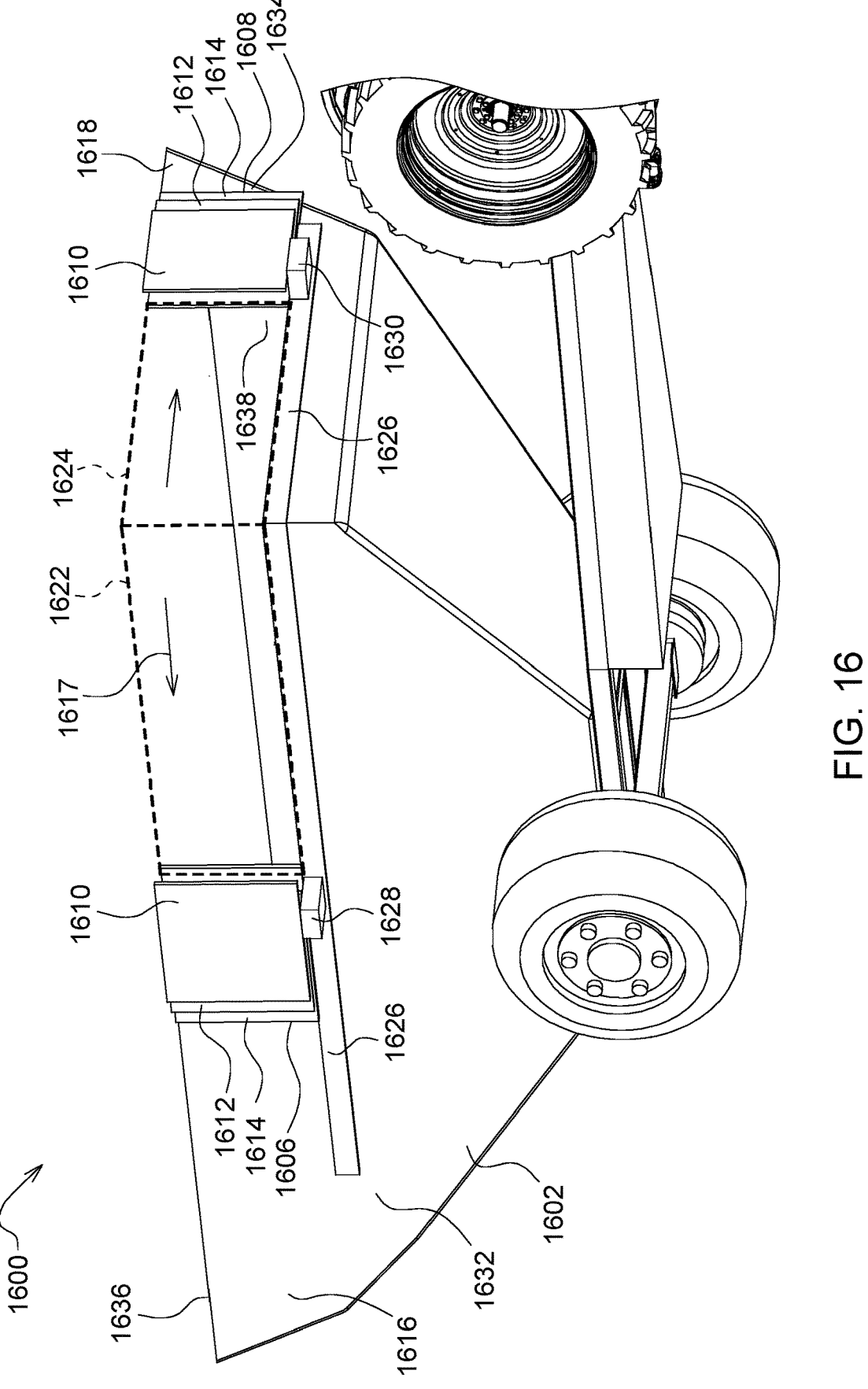
FIGS. 16 and 17 are oblique views of another example grain cart having doors having a plurality of panels that are slideable in a generally horizontal direction, according to some implementations of the present disclosure.
Figure 17:
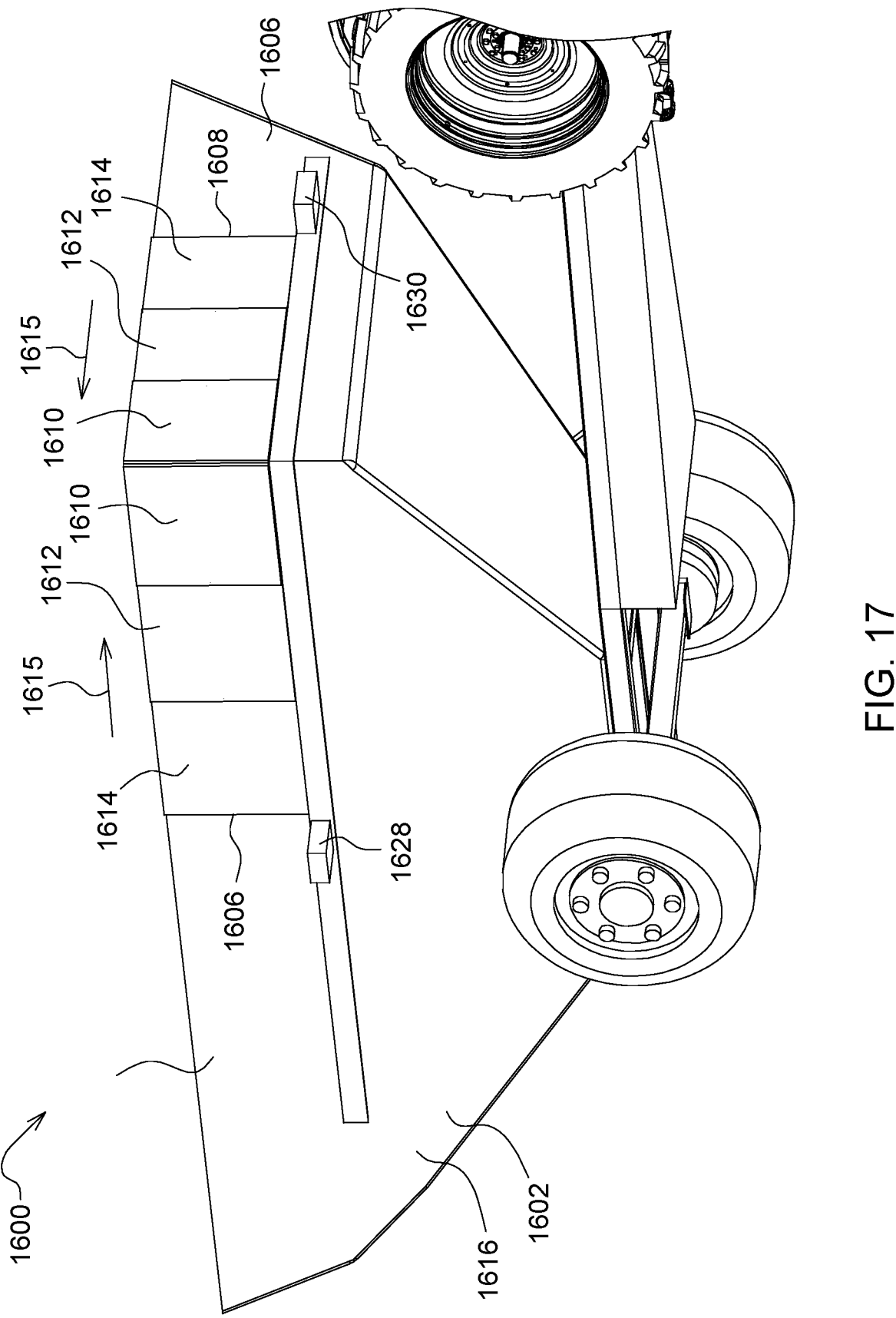

FIGS. 16 and 17 illustrate another example grain cart 1600 having a bin 1602 that defines a cavity 1604. The grain cart 1600 is similar to grain carts 200, 700, 800, 1000, 1200, and 1400 except that the grain cart 1600 includes doors 1606 and 1608 that are formed of a plurality of panels 1610, 1612, 1614 that are slideable movable relative to each other. Each panel is slideable coupled relative to adjacent panels such that one panel is slides relative to the other by a selected amount. When the first panel 1610 slides away from the adjacent second panel 1612 in the direction of arrow 1615 by a selected amount, such as when the door 1606 or 1608 is being closed, the first panel 1610 engages the second panel 1612 and causes the second panel 1612 to slide along with the first panel 1610. Similarly, the second panel 1612 slides relative to a third panel 1614 adjacent thereto until the second panel 1612 slides a selected amount relative to the third panel 1614 at which time the third panel 1614 engages the second panel 1612 and moves along therewith. The slideably coupled panels 1610, 1612, and 1614 extend in this manner until the door 1606 or 1608 is fully extended into the closed position, as shown in FIG. 17.

When the doors 1606 or 1608 open, the first panel 1610 slides in the direction of arrow 1617 relative to the second panel 1612 until the first panel 1610 has slid a selected amount relative to the second panel 1612 at which time the first panel 1610 engages the second panel 1612. Thereafter, the first and second panels 1610, 1612 slide together relative to the third panel 1614. The first and second panels 1610, 1612 slide relative to the third panel 1614 for a selected distance until the second panel 1612 engages the third panel 1614 at which time the first, second, and third panels 1610, 1612, and 1614 slide together. Although the doors 1606 and 1608 each include three panels, other implementations may include additional or fewer panels. This described movement continues for all of the panels that are coupled together in a sliding manner until the panels are in a stacked configuration (as shown in FIG. 16), resulting in the door 1606 or 1608 being in the open position.

The doors 1606 and 1608 are extendable and retractable along respective walls 1616 and 1618 to cover and uncover respective openings 1622 and 1624 (illustrated in dashed lines). The doors 1606 and 1608 are movable along tracks, rails, grooves, or slots (collectively referred to as "tracks" 1626) formed into or included on the walls 1616 and 1618. The doors 1606 and 1608 are movable in response to operation of actuators 1628 and 1630, respectively. Example actuators include linear actuators (e.g., electrical, hydraulic, or pneumatic linear actuators) or rotary actuators (e.g., electrical, pneumatic, or hydraulic rotary actuators). However, other types of actuators can be used to move the doors 1606 and 1606 between the open and closed positions. Further, the actuators 1628 and 1630 can be located outside of the cavity 1604 (e.g., along exterior surfaces 1632 and 1634 of the walls 1616 and 1618, respectively) or within the cavity 1604 (e.g., along interior surfaces 1636 and 1638 of the walls 1616 and 1618, respectively). In still other implementations, one or both of the actuators 1628 and 1630 can be embedded within the walls 1616, 1618 or another portion of the grain cart 1600.

Figure 18:
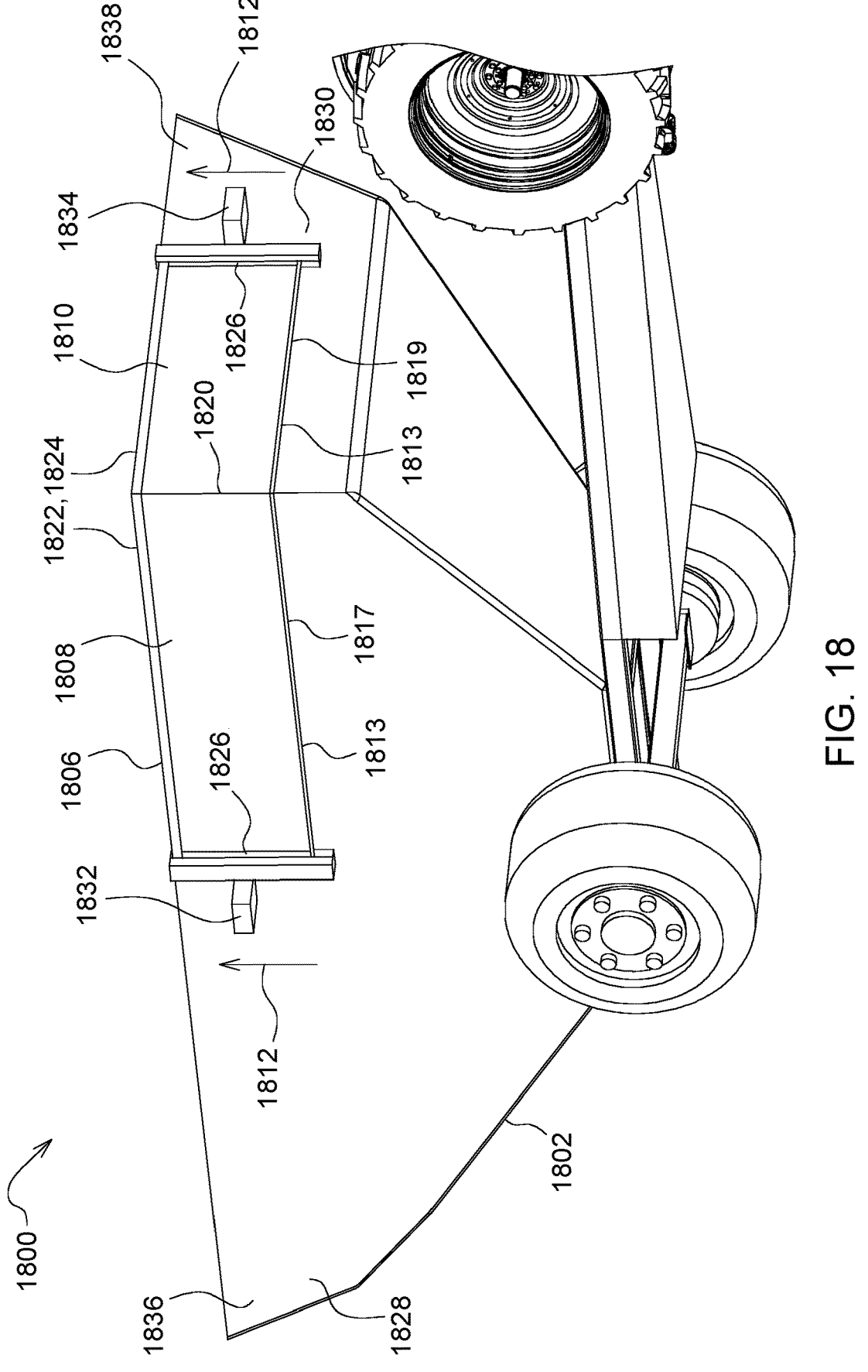
FIGS. 18 and 19 are oblique views of another example grain cart having a flexible door moveable in a generally vertical direction, according to some implementations of the present disclosure.
Figure 19:
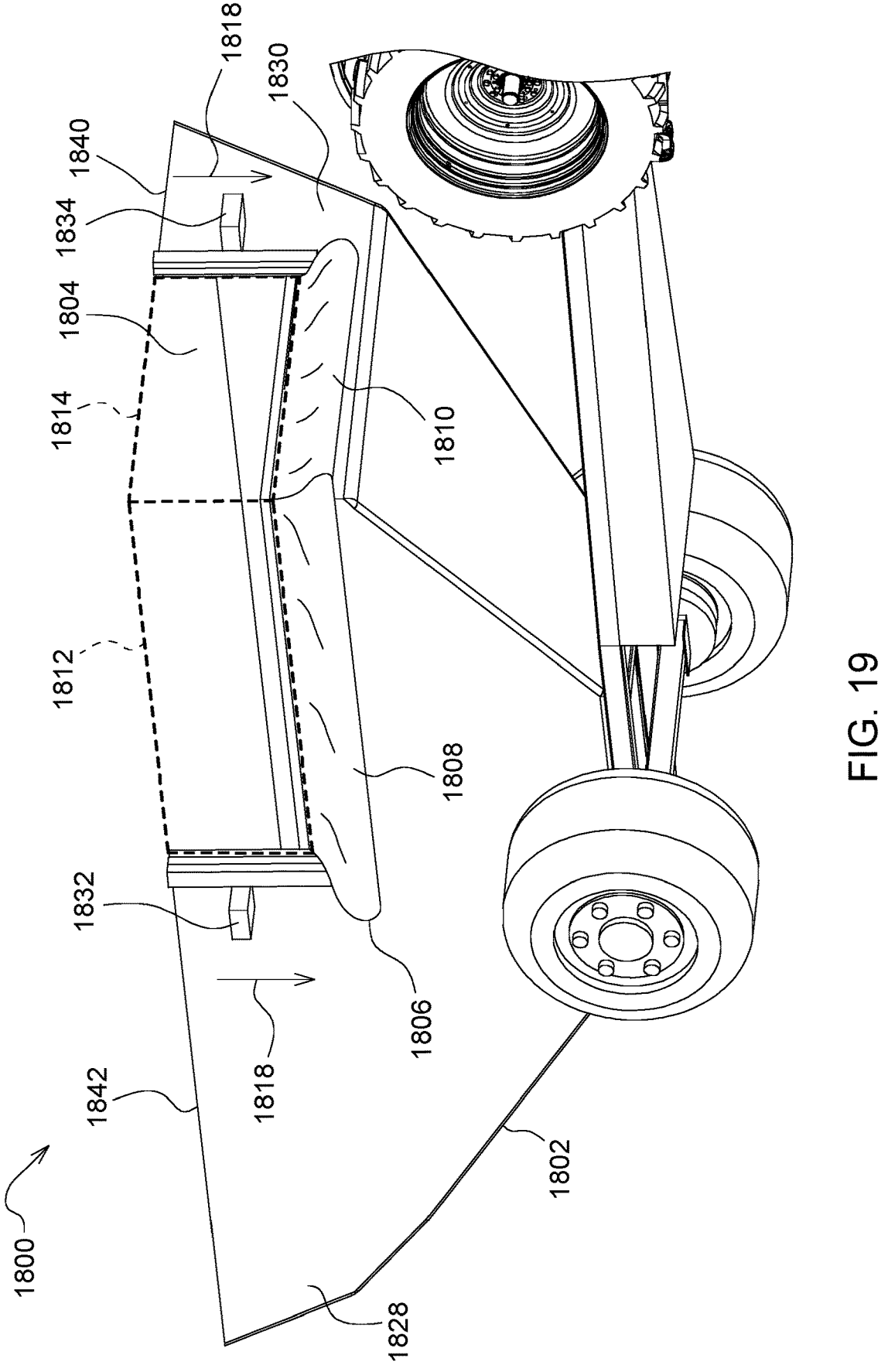

FIGS. 18 and 19 illustrate another example grain cart 1800 having a bin 1802 that defines a cavity 1804. The grain cart 1800 is similar to grain carts 200, 700, 800, 1000, 1200, 1400, and 1600 except that the grain cart 1800 includes a door 1806 having connected panels 1808 and 1810 that are raised in the direction of arrow 1812 into a closed position to conceal openings 1814 and 1816 (illustrated in dashed lines in FIG. 19) or lowered in the direction of arrows 1818 into an open position to expose openings 1814 and 1816. In some implementations, ends 1813 of the door panels 1808, 1810 are coupled to edges 1817 and 1819 of walls 1828 and 1830, respectively. The edges 1817 and 1819 define a portion of the openings 1812 and 1814, respectively. The door panels 1808 and 1810 are formed of a flexible material. In some implementations, when in the raised or closed position, the door panels 1808 and 1810 are pulled taut to form a stiff barrier. In some implementations, when placed into the lowered or open position, the door panels 1808 and 1810 are in a loose configuration in which the door panels 1808 and 1810 can fold over onto themselves. In some implementations, the door panels 1808 and 1810 are connected along a corner 1820 and raise and lower together between the closed and opened positions. In this way, the corner 1820 avoids a gap that could otherwise be a source of grain loss. In other implementations, the door panels 1808 and 1810 are discrete panels that are linked at the corner 1820, such as via a rod or other component (not illustrated) that raises and lowers as the door 1806 raised into the closed position or lowered into the open position. In this way, a gap formed between the door panels 1808 and 1810 is avoided. In some implementations, the door panels 1808 and 1810 includes a rigid component 1822 (e.g., an elongated rod or shaft) extending along an edge 1824 of the respective door panels 1808 and 1810. In some instances, the rigid components 1822 are coupled together at the corner 1820, such as directly or via the rod or other component provided at the corner 1820 that extends and retracts along with the door panels 1808 and 1810 as the door 1806 is moved between the open and closed positions.

The door 1806 is movable along tracks, rails, grooves, or slots (collectively referred to as "tracks" 1826) formed into or included on the walls 1828 and 1830. The door panels 1808 and 1810 are moveable in response to respective actuators 1832 and 1834. Example actuators include linear actuators (e.g., electrical, hydraulic, or pneumatic linear actuators) or rotary actuators (e.g., electrical, pneumatic, or hydraulic rotary actuators). However, other types of actuators can be used to move the doors panels 1808 and 1810 between the open and closed positions. Further, the actuators 1832 and 1834 can be located outside of the cavity 1804 (e.g., along exterior surfaces 1836 and 1838 of the walls 1828 and 1830, respectively) or within the cavity 1804 (e.g., along interior surfaces 1840 and 1842 of the walls 1828 and 1830, respectively). In still other implementations, one or both of the actuators 1832 and 1834 can be embedded within the walls 1828, 1830 or another portion of the grain cart 1800.

Figure 20:
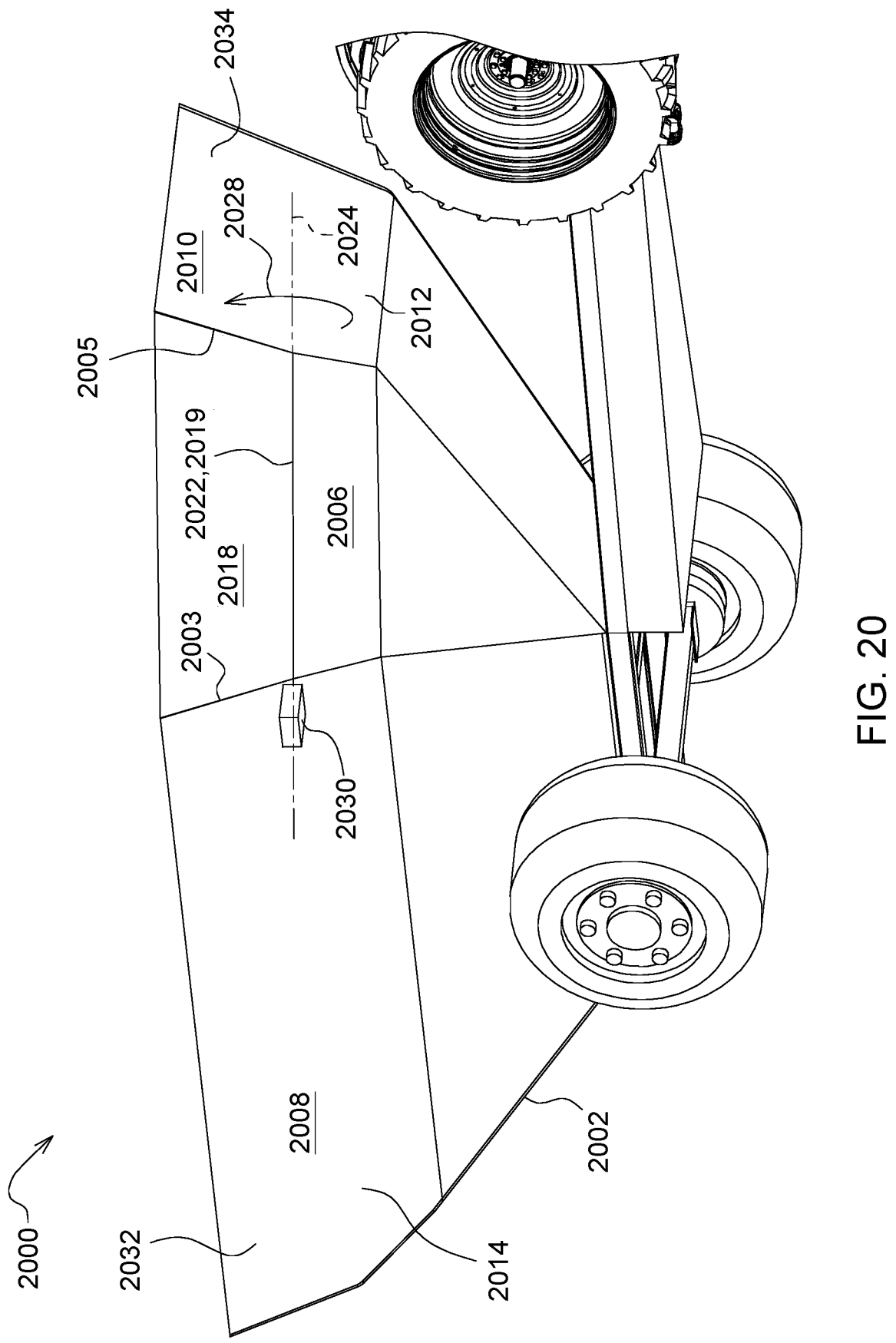
FIGS. 20 and 21 are oblique views of another example grain cart having a single hinged door pivotable about a horizontal axis, according to some implementations of the present disclosure.
Figure 21:
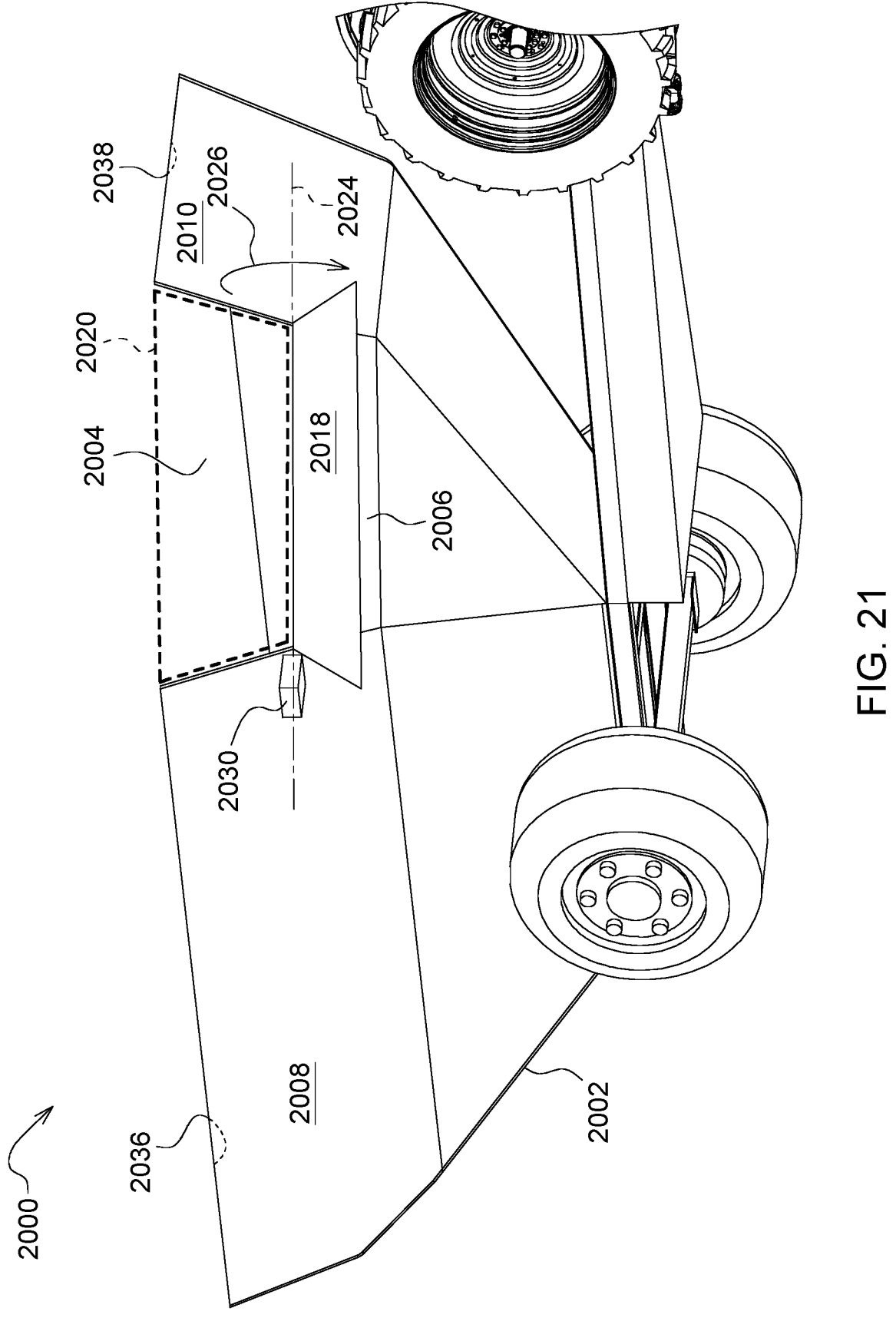

FIGS. 20 and 21 illustrate another example grain cart 2000 having a bin 2002 that defines a cavity 2004. The bin 2002 includes a wall 2006 extending between two adjacent walls 2008 and 2010 forming a side 2014 and a forward end 2012 of the bin 2002, respectively. The wall 2006 is angled relative to the walls 2008 and 2010. The wall 2006 is disposed at the forward end 2012. The wall 2006 includes a door 2018 that is movable to provide access to the cavity 2004, such as by an unloader of a combine harvester.

In the illustrated example, the door 2018 is movable between an open position and a closed position to uncover and conceal, respectively, an opening 2020 (indicated in dashed lines). The opening 2020 is defined by an upper edge 2019 of the wall 2006 and edges 2003 and 2005 of the adjacent walls 2008 and 2010, respectively. The door 2018 is pivotably connected to wall 2006 via a hinged connection 2022. The door 2018 pivots about a generally horizontal axis 2024 defined by the hinged connection 2022. The door 2018 pivots in a direction of arrow 2026 when the door 2018 is moved into the open position and pivots in a direction of arrow 2028 when the door 2018 is moved in into the closed position. In other implementations, the door 2018 is movable in other ways. For example, the door 2018 may be movable or configurable in any of the other ways described herein. For example, in some instances, the door 2018 is pivotably about a generally vertical axis, such as along edge 2003 or edge 2005. In other instances, the door 2018 may be slidable in a manner similar to the doors 1206 and 1208; slideable in a manner similar to doors 1002 and 1004; or multi-paneled and slideable similar to doors 1606 and 1608. In some instances, the door 2018 may be formed from a flexible material and movable in a manner similar to that explained above with respect to door 1806. Still further, the door 2018 may be configured similar to doors 1406 and 1408, such that the door 2018 can be furled or unfurled.

The grain cart 2000 includes one or more actuators 2030 to move the door 2018 between the open and closed positions. Example actuators include linear actuators (e.g., electrical, hydraulic, or pneumatic linear actuators) or rotary actuators (e.g., electrical, pneumatic, or hydraulic rotary actuators). However, other types of actuators can be used to move the door 2218 between the open and closed positions. Further, the actuators 2030 can be located outside of the cavity 2004 (e.g., along exterior surfaces 2032 and 2034 of the walls 2008 and 2010, respectively) or within the cavity 2004 (e.g., along interior surfaces 2036 and 2038 of the walls 2008 and 2010, respectively). In still other implementations, the actuator 2030 can be embedded within the walls 2008 and 2010 or another portion of the grain cart 2000.

Without in any way limiting the scope, interpretation, or application of the claims appearing below, a technical effect of one or more of the example implementations disclosed herein is providing a grain cart capable of traveling in closer proximity to a combine harvester during an unloading operation. Another technical effect of one or more of the example implementations disclosed herein is providing a movable door or panel to allow ingress and egress of a conveyor, such as an unloader of a combine harvester, to an interior cavity of the grain cart. Another technical effect of one or more of the example implementations disclosed herein is to improve harvesting efficiency and reduce harvesting time by providing a grain cart capable of unloading a combine harvester during a breakthrough harvesting pass.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A vehicle for collecting agricultural material during an agricultural operation, the vehicle comprising:
    a frame;

a ground engaging component coupled to the frame, the ground engaging component operable to move along the ground; and a bin defining a volume configured to receive agricultural material, the bin comprising:

an open end in communication with the volume;

a first wall; and a first door coupled to the first wall and movable between an open position and a closed position, the first door exposing a first opening in the first wall as the first door is moved to the open position, wherein the bin comprises a second wall adjacent to the first wall, wherein the second wall defines a second opening extending from the open end, wherein the bin comprises a second door coupled to the second wall, the second door being movable between an open position and a closed position, wherein the second opening is exposed as the second door is moved to the open position, and wherein the first opening and the second opening are joined to form a continuous opening, wherein the first door is slideable relative to the first wall, and wherein the first door is slideable relative to the first wall in a direction that includes a vertical component.

2. The vehicle of claim 1, wherein the first opening extends from the open end.

3. The vehicle of claim 1, wherein the first wall defines a first edge extending along at least a portion of the open end, wherein the first opening is defined at least partially by a second edge of the first wall, and wherein the second edge extends from the first edge.

4. The vehicle of claim 1, wherein an interface between the first wall and the second wall comprises a corner of the bin.

5. The vehicle of claim 1, wherein the bin further comprises a flexible material extending between adjacent ends of the first wall door and the second wall door.

6. The vehicle of claim 5, wherein the flexible material seals a gap formed between the adjacent ends of the first door and the second door when the first wall and the second wall are in the closed position.

7. The vehicle of claim 1, wherein the bin further comprises an actuator coupled to the first door that causes the first door to move between the open position and the closed position.

8. The vehicle of claim 1, further comprising a conveyor configured to unload contents contained in the bin.

9. A vehicle for collecting agricultural material during an agricultural operation, the vehicle comprising:

a frame;

a ground engaging component coupled to the frame, the ground engaging component operable to move along the ground; and a bin defining a volume configured to receive agricultural material, the bin comprising:

an open end in communication with the volume;

a first wall; and a first door coupled to the first wall and movable between an open position and a closed position, the first door exposing a first opening in the first wall as the first door is moved to the open position, wherein the bin comprises a second wall adjacent to the first wall, wherein the second wall defines a second opening extending from the open end, wherein the bin comprises a second door coupled to the second wall, the second door being movable between an open position and a closed position, wherein the second opening is exposed as the second door is moved to the open position, wherein the first opening and the second opening are joined to form a continuous opening, wherein the first door is slideable relative to the first wall, and wherein the first door is slideable relative to the first wall in a direction that includes a horizontal component.

10. A vehicle for collecting agricultural material during an agricultural operation, the vehicle comprising:

a frame;

a ground engaging component coupled to the frame, the ground engaging component operable to move along the ground; and a bin defining a volume configured to receive agricultural material, the bin comprising:

an open end in communication with the volume;

a first wall; and a first door coupled to the first wall and movable between an open position and a closed position, the first door exposing a first opening in the first wall as the first door is moved to the open position, wherein the bin comprises a second wall adjacent to the first wall, wherein the second wall defines a second opening extending from the open end, wherein the bin comprises a second door coupled to the second wall, the second door being movable between an open position and a closed position, wherein the second opening is exposed as the second door is moved to the open position, wherein the first opening and the second opening are joined to form a continuous opening, wherein the first door is formed of a flexible material, and wherein movement of the first door from the closed position to the open position comprises movement of the first door from an unfurled configuration into a furled configuration.

11. The vehicle of claim 10 wherein, in the furled configuration, the first door forms a roll defining a horizontal axis.

12. The vehicle of claim 10, wherein, in the furled configuration, the first door forms a roll defining an axis extending in a direction having a vertical component.

* * * * *